May 9, 1967  F. E. HILTON  3,318,230
TYING MACHINE

Filed May 12, 1965  10 Sheets-Sheet 1

FRANK E. HILTON
INVENTOR

BY
BUCKHORN, BLORE, KLARQUIST & SPARKMAN
ATTORNEYS

May 9, 1967  F. E. HILTON  3,318,230
TYING MACHINE

Filed May 12, 1965  10 Sheets-Sheet 3

FRANK E. HILTON
INVENTOR

BY
BUCKHORN, BLORE, KLARQUIST & SPARKMAN
ATTORNEYS

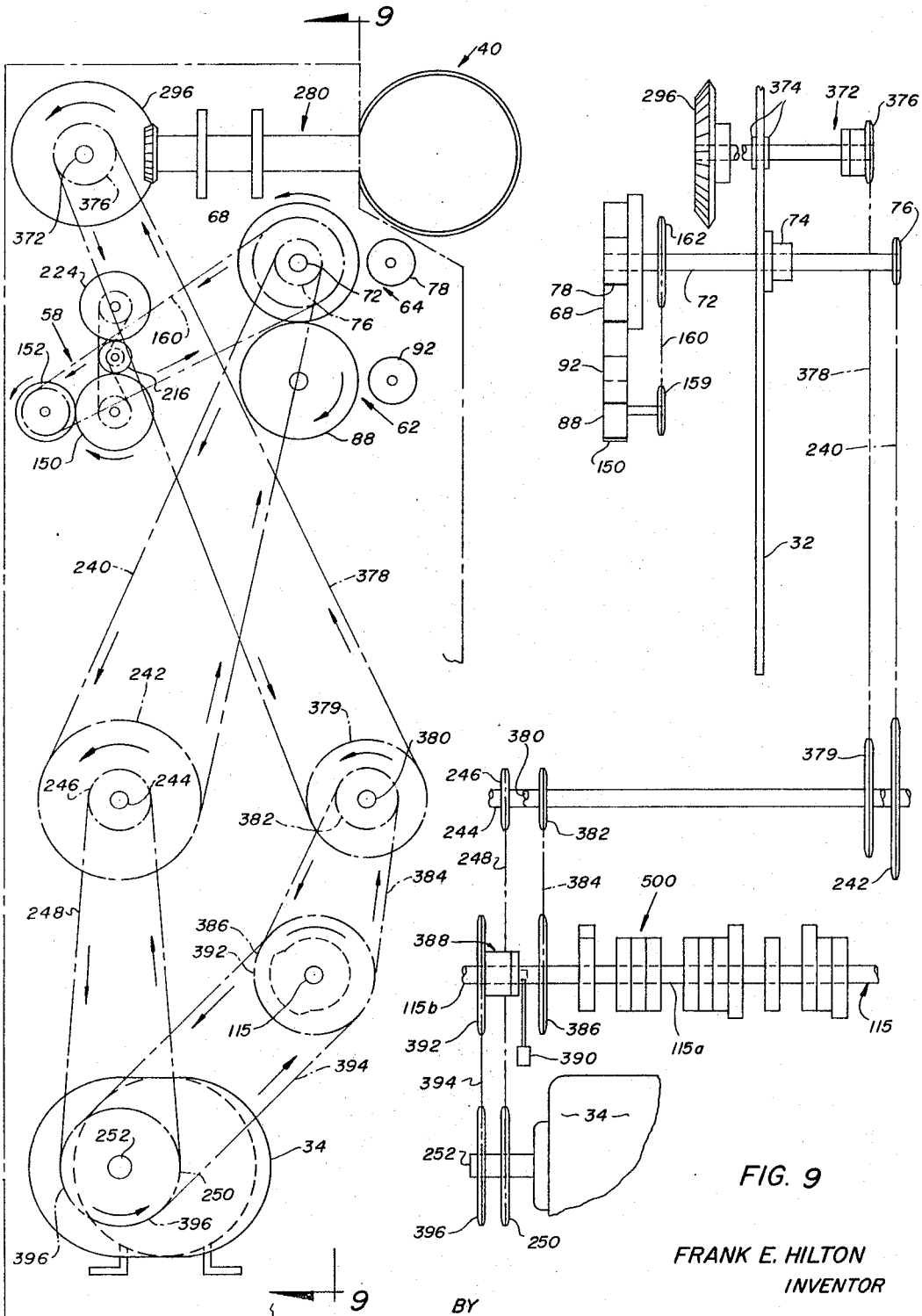

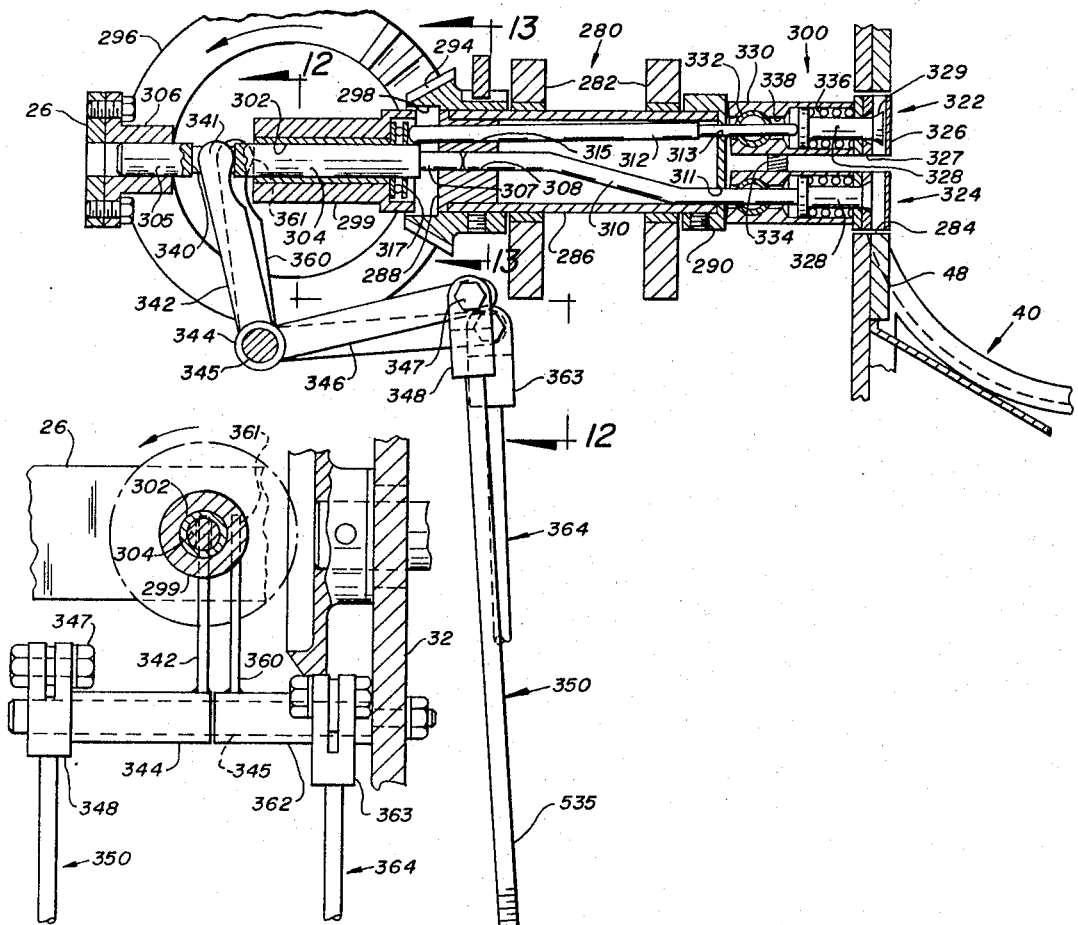
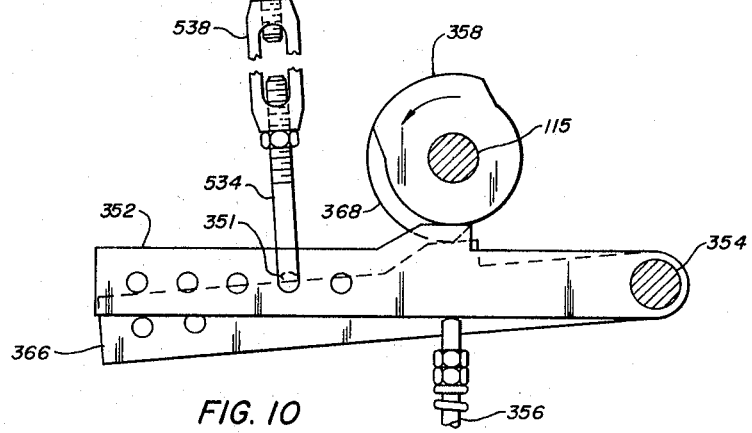

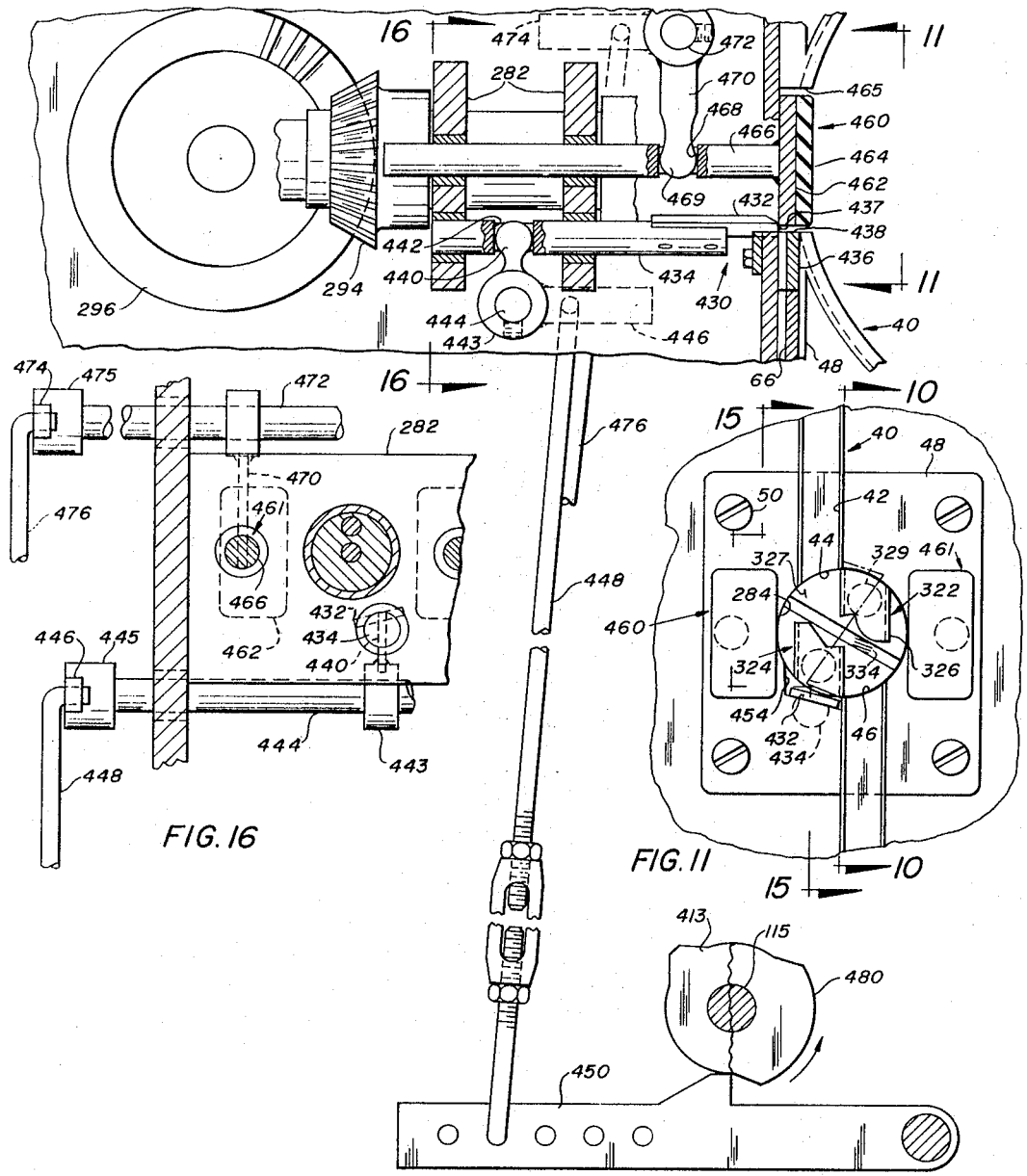

May 9, 1967  F. E. HILTON  3,318,230
TYING MACHINE

Filed May 12, 1965  10 Sheets-Sheet 8

FRANK E. HILTON
INVENTOR
BY
BUCKHORN, BLORE, KLARQUIST & SPARKMAN
ATTORNEYS

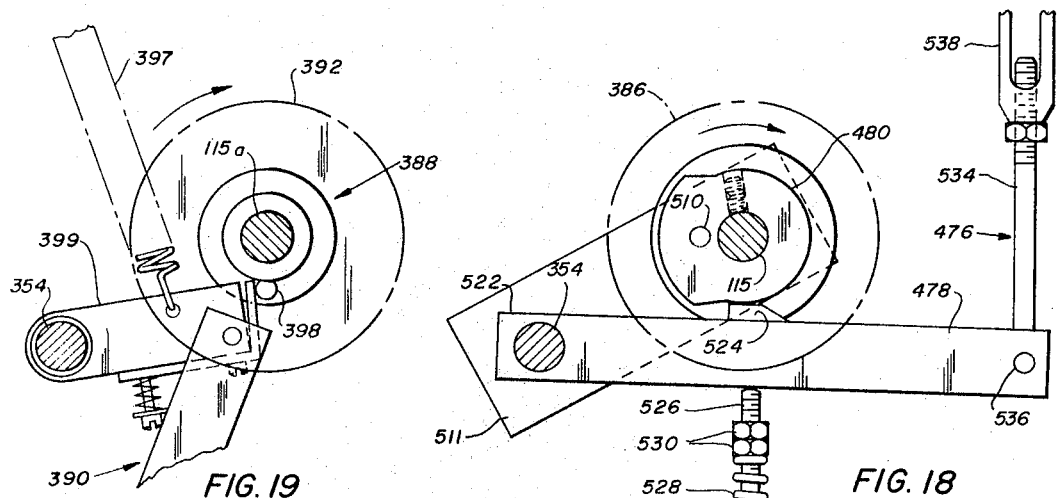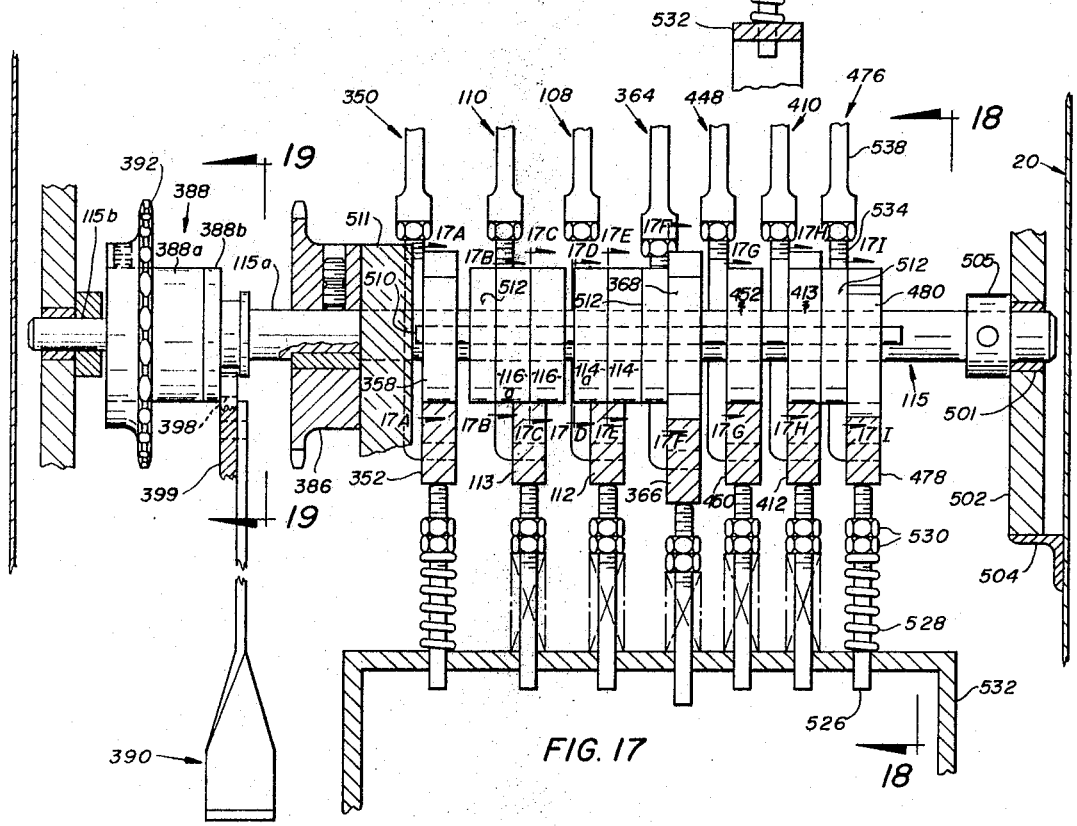

May 9, 1967 F. E. HILTON 3,318,230
TYING MACHINE
Filed May 12, 1965 10 Sheets-Sheet 10

FRANK E. HILTON
INVENTOR
BY
BUCKHORN, BLORE, KLARQUIST & SPARKMAN
ATTORNEYS

United States Patent Office 3,318,230
Patented May 9, 1967

3,318,230
TYING MACHINE
Frank E. Hilton, Portland, Oreg., assignor to Package Containers, Inc., Portland, Oreg., a corporation of Oregon
Filed May 12, 1965, Ser. No. 455,105
26 Claims. (Cl. 100—4)

The present invention relates to a tying machine and more particularly to an improved machine for tying into a bundle a group of items such as produce, with a loop of tying tape.

The present machine is an improvement over the tying machine of United States Patent No. 2,880,666, issued Apr. 7, 1959, to John E. Rogers, primarily with respect to the drive and timing mechanisms thereof. The present machine incorporates among other things an improved mechanical drive and timing arrangement which is more positive and reliable than the air-driven mechanisms of the earlier machine.

Accordingly, a primary object of the present invention is to provide a new and improved tying machine which is more simplified in construction and more positive in operation than prior such machines.

More specifically, an object is to provide an improved machine incorporating a novel, precise and readily adjustable cam timing mechanism for coordinating the various operations performed by such machine.

Another object is to provide an improved tying machine having a novel mechanical drive that is easier to adjust and maintain than prior such machines.

Still another object is to provide a bundle-tying machine incorporating a new and improved tape-feeding mechanism.

Another object is to provide a bundle-typing machine having a new, improved and greatly simplified means for tightening a loop of tape about a bundle by reversing the tape without having to reverse the direction of the tape-feeding mechanism.

A further object is to provide a bundle-tying machine incorporating a new and improved tape-twisting mechanism for securing a loop of tape about a bundle.

The above and other objects, features and advantages of the invention will become apparent in the following detailed description and the accompanying drawings, wherein:

FIG. 8 is a slightly enlarged schematic, side elevational view of the primary drive system for the various mechanisms shown in FIG. 1;

FIG. 9 is a view taken approximately along the line 9—9 of FIG. 8;

Figures 1, 2, 3, 4:
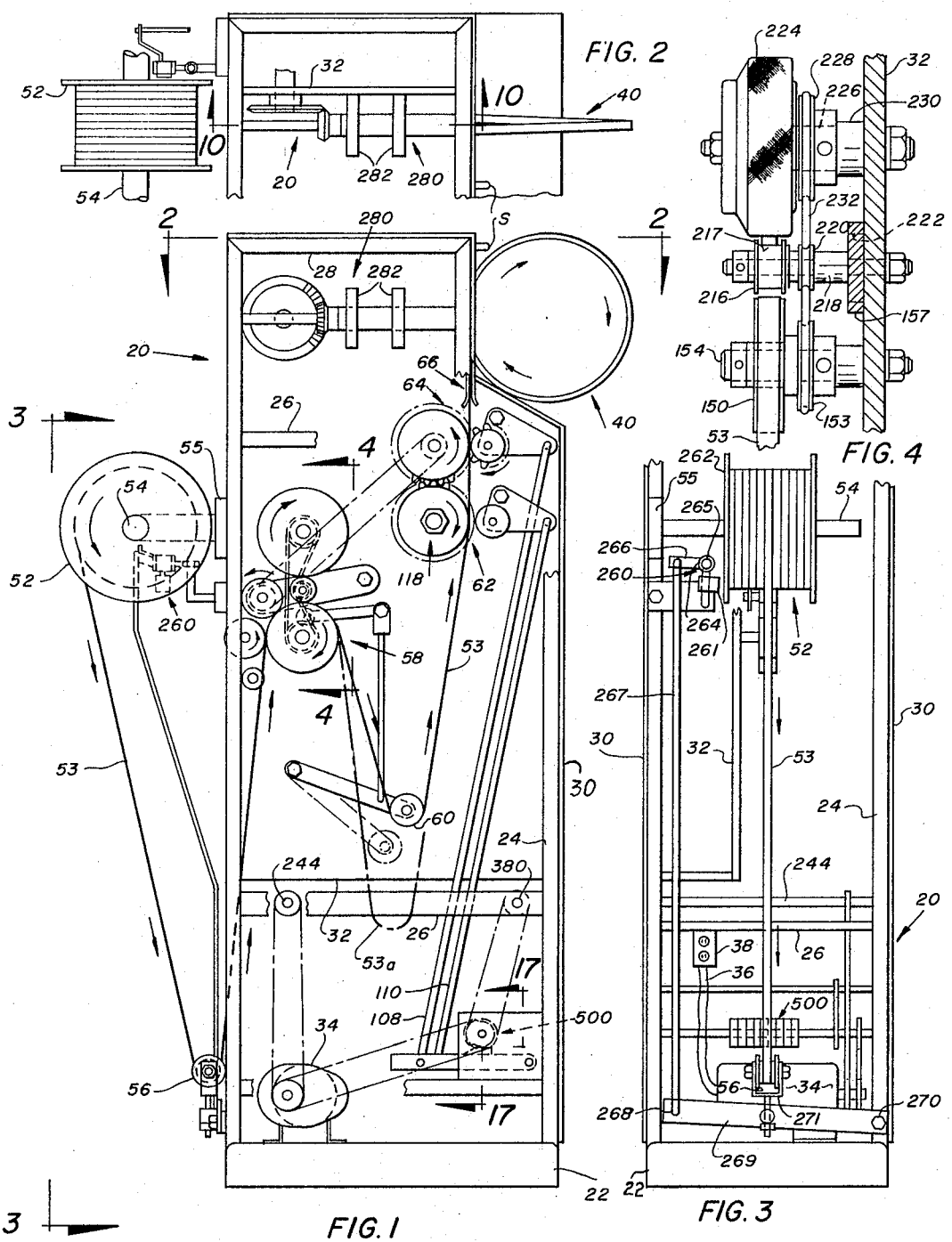
FIG. 1 is a schematic side elevational view of one side of a tying machine with the outer walls normally enclosing the machine removed.
FIG. 2 is a schematic fragmentary top plan view of the machine of FIG. 1.
FIG. 3 is a fragmentary schematic rear end view taken approximately along the line 3—3 of FIG. 1.
FIG. 4 is an enlarged vertical sectional view taken approximately along the line 4—4 of FIG. 1 showing a portion of the tape feed and print roll assembly.
Figure 13:
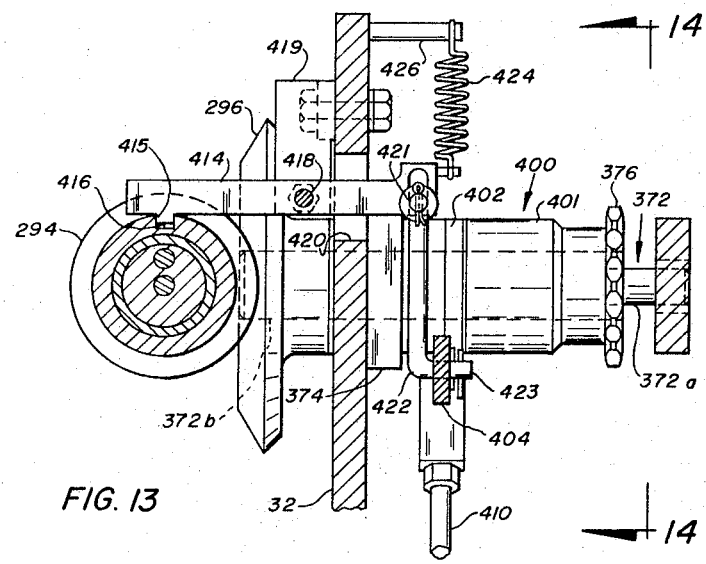
Figure 14:
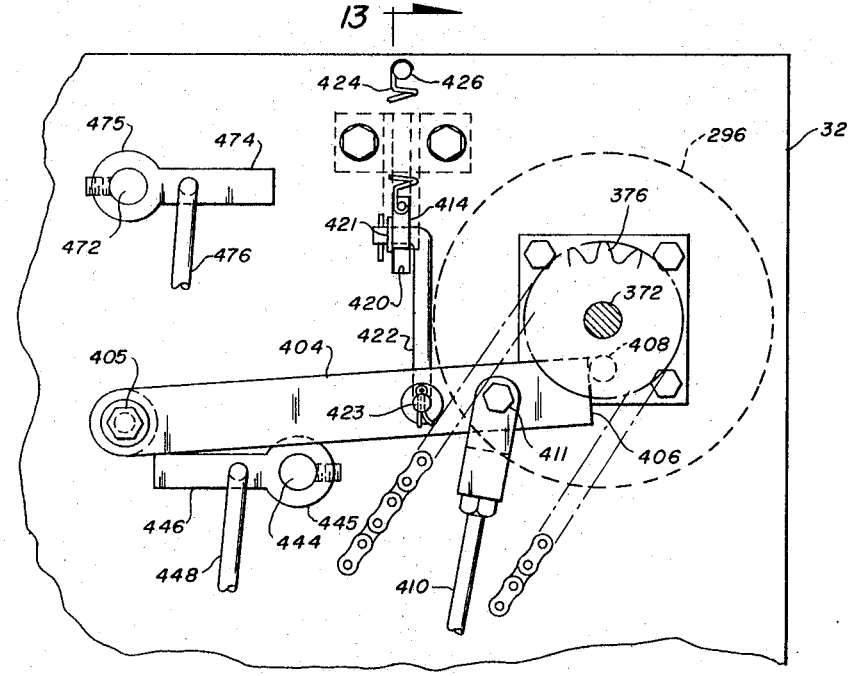
Figure 20:
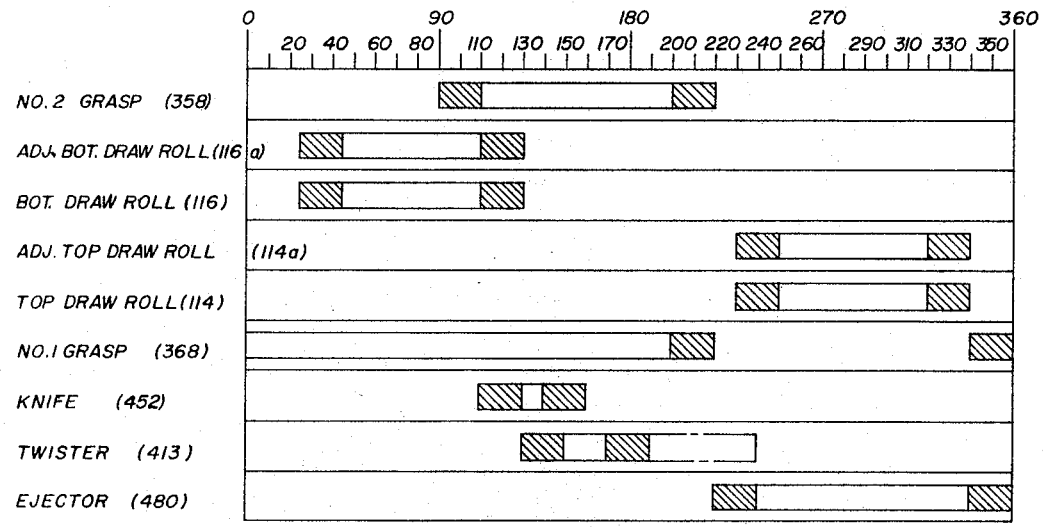

FIG. 10 is an enlarged view partly in section, taken generally along the line 10—10 of FIG. 2 except that the twister assembly has been rotated through about 45 degrees as indicated by the line 10—10 of FIG. 11, such view showing the twister assembly, tape-clamping means and drive for the clamping means;

FIG. 11 is a view taken along the line 11—11 of FIG. 15 showing a front face portion of the machine;

FIG. 12 is a fragmentary sectional view taken along the line 12—12 of FIG. 10 showing a portion of the clamp-actuating mechanism;

FIG. 13 is a side view, partly in section, on about the same scale as FIG. 10 and taken generally along the line 13—13 of FIGS. 10 and 14, showing a portion of the twister drive mechanism;

FIG. 14 is a fragmentary side view taken generally along the line 14—14 of FIG. 13 on the reverse side of the machine from that shown in FIG. 1, showing portions of the ejector, knife-actuating and twister drive mechanisms;

FIG. 15 is a view on about the same scale as FIG. 10 and taken generally along the line 15—15 of FIG. 11, showing the knife assembly and knife-actuating mechanism, and the ejector assembly and ejector-actuating mechanism;

FIG. 16 is a sectional view taken along the line 16—16 of FIG. 15 showing a portion of the knife and ejector-actuating mechanisms;

FIG. 17 is an enlarged fragmentary elevational view, partly in section and taken along the line 17—17 of FIG. 1, showing the cam and follower assembly;

FIGS. 17A through 17I are sectional views taken along the lines 17A—17A through 17I—17I of FIG. 17, on a scale slightly larger than that of FIG. 17, showing the details of each cam and its position on the cam shaft relative to that of the other cams;

FIG. 18 is a fragmentary vertical sectional view taken along the line 18—18 of FIG. 17;

FIG. 19 is a view taken along the line 19—19 of FIG. 17 on approximately the same scale as that of FIG. 17 showing the detail of the cam shaft clutch release mechanism; and FIG. 20 is a bar diagram illustrating the sequence of operation and dwell of the various cams of FIG. 17.

GENERAL DESCRIPTION AND SUMMARY
OF OPERATION

With reference to FIG. 1 of the drawings, the illustrated tying machine includes a frame 20 which carries a spool 52 of tying tape 53 made of paper having a central wire core to provide strength and to permit the tape to be secured about a bundle by twisting the ends thereof together. The tape is threaded between three sets of draw rolls, including two sets of forward draw rolls 58 and 64 which feed a predetermined length of the tape into a hoop, or ring, member 40 which forms the tape into a large loop about a bundle held within the ring. After the tape is looped, the free end thereof is clamped by the first clamp 322 of two clamps mounted on the forward end of a rotatable twister assembly 280 mounted horizontally within the frame adjacent the base of the ring. After the tape is formed into a loop and its forward end clamped, the direction of the tape is reversed to tighten the loop about the bundle within the ring by engaging the third set of draw rolls 62, hereafter referred to as the reverse draw rolls. An adjustable torque limiter 118 on one of the reversing draw rolls enables such rolls to draw the loop about the bundle to a preset tension less than the breaking strength of the tape. Thereafter the second clamp 324 (FIG. 10) at the forward end of the twister assembly 280 clamps the opposite end of the loop of tape, after which a knife mechanism 430 (FIG. 15) just beneath the second clamp severs the tape below the loop. The twister assembly 280 is then rotated to twist the ends of the loop together about the bundle. Following this, both clamps are released, and a pair of ejectors 460, 461 (FIG. 15) on opposite sides of the twister assembly push the tied bundle away from the front face of the machine, thus clearing the clamps and ring member of tape so that another length of tape can be fed into the ring member by the forward draw rolls in readiness for the next cycle of the machine. The entire sequence of the foregoing operations is controlled by a cam assembly 500 including a series of cams affixed to a common cam shaft, which operate associated connecting rods to activate the various mechanisms at the appropriate time to perform the foregoing functions.

GENERAL ASSEMBLY

Referring to FIGS. 1, 2 and 3, the tying machine includes an upright structural framework generally designated at 20, having a base 22 supporting the framework at floor level, upright frame members 24 at the four corners of the machine, and various cross frame members 26 and top frame members 28 defining a generally rectangular framework. The framework is enclosed on its opposite sides, front and top by sheet metal walls 30, one sidewall of which is shown removed in FIG. 1 to reveal the interior working parts. The open side of FIG. 1 would normally be closed by a sheet metal wall having a large access door (not shown) for maintenance purposes.

As shown most clearly in FIGS. 2 and 3, the upper portion of the interior of the machine is divided into two parts by a vertical interior partition 32 extending from the front to the back of the machine. The partition provides a means for mounting many of the machine elements, and particularly the various shafts on which many of the wheels, rollers and sprockets of the drive mechanism are carried.

The prime mover for all of the machine's moving parts is a gear head electric motor 34 mounted on the base 22 near the back of the machine. Electrical conductor wires 36 connect the windings of the motor to an electrical outlet 38 so that the machine can be connected to any A.C. source. The motor is selectively energized by a toggle switch S conveniently positioned on the upper front face of the machine.

A loop-forming means comprising a ring- or hoop-shaped member 40 is mounted on the upper front face of the machine and extends outwardly therefrom. As shown best in FIGS. 2 and 11, the ring 40 is formed in the shape of a helix and has an interior groove, or track, 42 which guides the tape about the ring. The ring terminates at its opposed infeed end 44 and outfeed end 46 in a ring base plate 48 which is attached by screws 50 to the front face of the machine. Thus tape fed into the groove 42 at the infeed end 44 of the ring and around the interior of the ring is formed into a loop.

TAPE FEED ASSEMBLY

The tape feed assembly shown generally in FIG. 1 and in greater detail in FIGS. 4 through 7, includes a reel, or spool, 52 of tying tape 53, the reel being rotatably carried by a horizontal reel shaft 54 mounted behind the back of the machine frame 20 by a bracket 55 attached to one of the upright frame members 24 at the back of the machine. Progressing from the reel in the forward direction in which the tape is fed therefrom, the tape passes downwardly and around an idler wheel 56 at the lower back of the machine, then upwardly through a rear set of forward draw rolls 58, then downwardly and around a second idler wheel 60. From there the tape extends vertically upwardly through a first tape guide 61a, between a pair of bottom, reversing draw rolls 62, through another tape guide 61b and upwardly releasable, dog-type clamp 63, and thence between a pair of top, forward draw rolls 64. From the top draw rolls the tape is fed through a chute 66 which directs the tape into the infeed end 44 of the ring member 40.

TOP DRAW ROLL ASSEMBLY

Figures 6, 7:
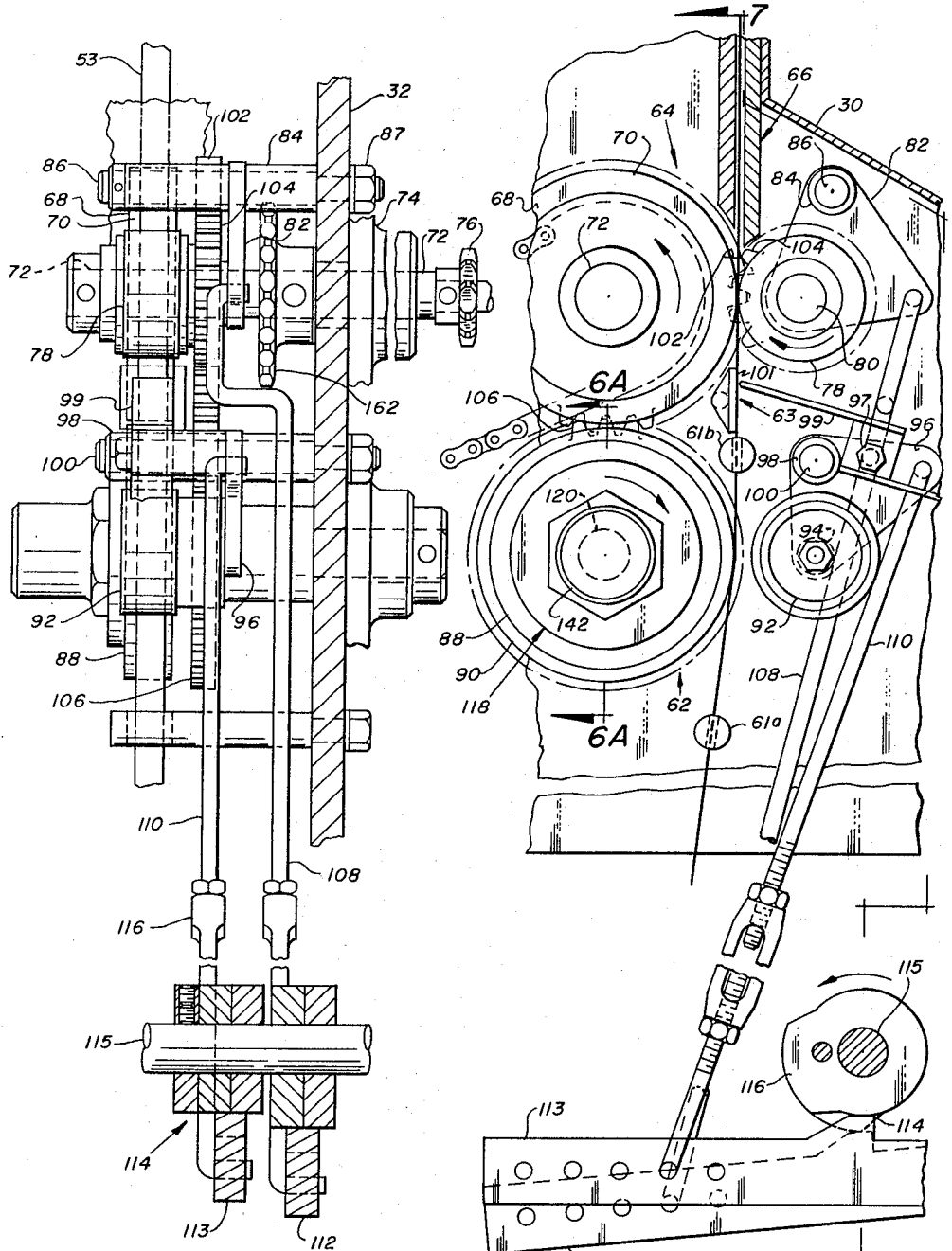
FIG. 6 is an enlarged view of another portion of the tape feed mechanism and drive therefor shown in FIG. 1, on approximately the same scale as FIG. 5.
FIG. 7 is a view on about the same scale as FIG. 6 taken generally along the line 7—7 of FIG. 6 showing the mounting and drive for the forward and reverse draw rolls.

Referring to FIGS. 6 and 7, the top pair of draw rolls 64 includes a feed roll 68 fixed to a stub shaft 72 which extends through the interior partition 32 and is rotatably mounted in a bearing housing 74 affixed to the side of the partition opposite the side on which the feed roll is mounted. A sprocket 76 is fixed to the same shaft on the opposite side of the interior wall for driving the feed roll through a system of sprockets and chains operatively connected to the motor 34 as shown schematically in FIG. 9. The top feed roll is preferably provided with a knurled metal peripheral surface 70.

The upper pair of draw rolls also includes a relatively small pressure roll 78 affixed to a stub shaft 80 which is rotatably mounted on a generally triangular pivot plate 82 adjacent one corner thereof. At least the outer portion of the pressure roll 78 is preferably made of rubber. The pivot plate 82 depends from and is fixedly secured to a bearing sleeve 84 rotatably carried on a pivot shaft 85 fastened to the partition 32 by nut member 87.

BOTTOM DRAW ROLL ASSEMBLY

The bottom pair of reversing rolls 62 includes a large bottom feed roll 88 having a rubber outer tire portion 90 and a cooperating bottom pressure roll 92. The bottom pressure roll is rotatably mounted vertically beneath the top pressure roll on a stub shaft 94 fixed to a lower, generally triangular pivot plate 96 which is suspended from and fixed to a bearing sleeve 98 rotatably carried by a lower pivot shaft 100, which is secured at its inner end to the interior partition 32. The lower pivot plate 96 also carries a shaft 97 on the outer end of which is pivotally mounted the movable dog portion 99 of the dog clamp 63. The dog is urged downwardly against the fixed clamp member 101 by a spring (not shown) attached to the rearwardly projecting portion of the dog 99 to prevent the tape 53 from dropping from between the top and bottom draw rolls and thus unthreading itself after the tape loop is severed therefrom. The constant pressure of the dog against the tape is not so great, however, as to prevent the reversing rolls from pulling the tape through the dog clamp to tighten the loop about an article.

TOP AND BOTTOM DRAW ROLL DRIVE

The top feed roll 68 is normally driven in a counterclockwise direction as shown in FIG. 6 by the chain and sprocket drive already mentioned. The upper feed roll is also drivingly connected to the upper pressure roll 78 and the lower feed roll 88 through a gear train including gear 102 on top feed roll shaft 72, gear 104 on top pressure roll shaft 80 and gear 106 on the bottom feed roll shaft 120. Thus rotation of the top feed roll in a counterclockwise direction rotates both the bottom feed roll and the top pressure roll in a clockwise direction.

The upper and lower pressure rolls are normally disengaged from their respective feed rolls even though they may be rotating as just described. However, the pressure rolls are movable into engagement with their feed rolls through actuation of connecting rods 108 and 110, which are connected, respectively, to the rearmost corner of the upper and lower pivot plates 82 and 96. The connecting rods are pivotally connected at their lower ends to follower arms 112 and 113, which arms are actuated by different cams 114 and 116 fixed to a common cam shaft 115, the details of which are described hereafter. The cams are shaped and arranged such that during each revolution of the cam shaft in a counterclockwise direction, first the top pressure roll engages the top feed roll to feed tape forwardly through chute 66 and into the ring member 40, and then following disengagement of the top pressure roll from the upper feed roll, the bottom pressure roll engages the bottom feed roll to reverse the direction of the tape.

TORQUE LIMITER ASSEMBLY

Figure 6A:
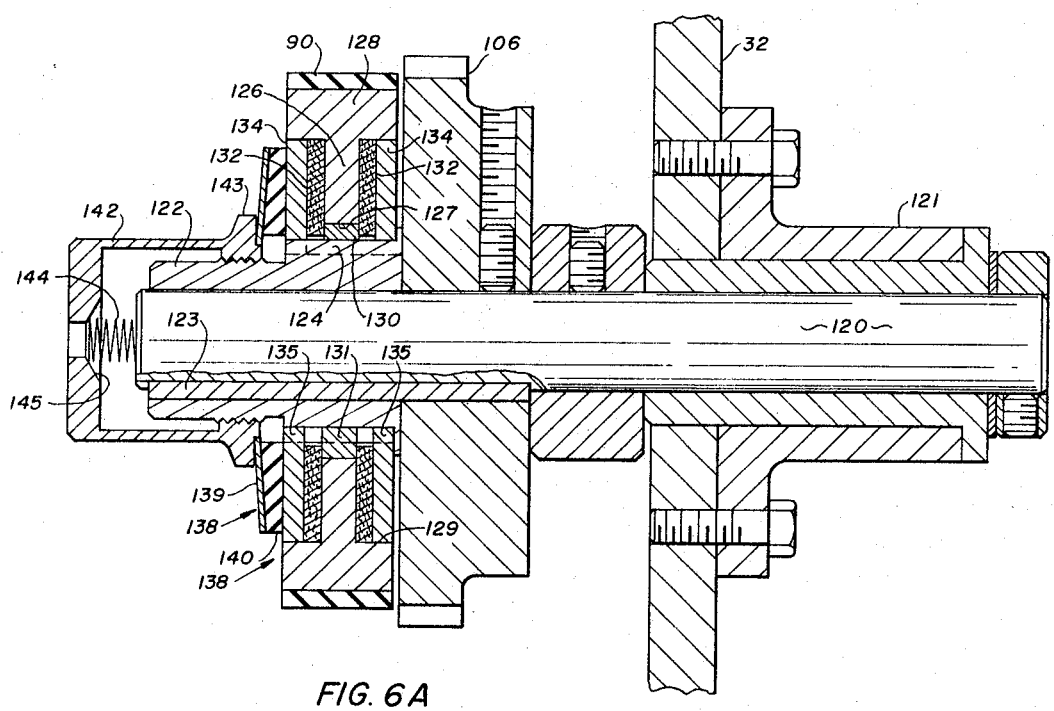
FIG. 6A is a vertical sectional view at about twice the scale of FIG. 6 taken along the line 6A—6A of FIG. 6 showing the construction of the reverse tape feed roll and torque limiter therefor.

The bottom feed roll 88 includes a torque-limiting means 118 whereby the feed roll is frictionally connected to its drive shaft 120 so that the roll will slip on the shaft when the tape applies a predetermined torque to the periphery of the roll. This, in effect, provides a means for preventing the reverse draw rolls from tightening the loop of tape about the bundle being tied beyond the breaking strength of the tape. With reference to FIG. 6A, the gear 106 is mounted on the bottom feed roll shaft 120 which in turn is rotatably mounted in a bearing housing 121 fixed to partition 32. The torque limiter includes a sleeve member 122 keyed at 123 to the shaft 120, the sleeve having a circumferentially splined inner end portion 124, the length of which is coextensive with the width of the feed roll. The feed roll itself has a metal interior portion including a central web 126 defining a small, central opening 127 which is slightly larger in diameter than the outer diameter of the splined shaft portion 124. The feed roll also includes an outer metal flange portion 128 defining outer enlargements 129 of the central opening 127.

The radially inner edge surface of the web 126 bears against a bronze or other bushing 130 which has an inwardly projecting key portion 131 which locks the bushing to the splined portion of the sleeve 122. A pair of friction discs 132 of abrasive material are positioned within the enlarged openings 129 against opposite sides of the web 126. Each friction disc has a central opening slightly larger than the outer diameter of the splined shaft portion. Laterally outwardly of the friction discs but within the enlarged openings 129 are a pair of metal end plates 134 having radially inwardly extending splines 135 which interlock with the splined shaft portion 124. A pressure plate 138 having a convex outer surface 139 and a resilient inner liner 140 bears against the outwardly facing one of the two end plates 134.

An internally threaded pressure cap 142 threads onto the sleeve 122 and has a flanged end portion 143 which bears against the convex outer surface of the pressure plate 138 to transmit variable pressure through such plate and the end plates 134 to the friction discs 132. Thus, with the cap bearing against the pressure plate, the roll will not slip relative to the discs and will therefore be driven with the shaft until the torque exerted on the roll in a direction opposite to the direction of rotation of the shaft exceeds a limit determined by the setting of the pressure cap. A compression spring 144 extends between the outer end of the shaft 120 and a concave depression 145 in the inside end of the cap 142 to resist unthreading of the cap from the sleeve. The cap is preferably set so that the roll will normally rotate with the drive shaft but will begin slipping relative thereto when the tying tape applies a predetermined torque to the outer periphery of the roll, thus preventing overtensioning of the tying tape.

REAR DRAW ROLL ASSEMBLY AND DRIVE

Figure 5:
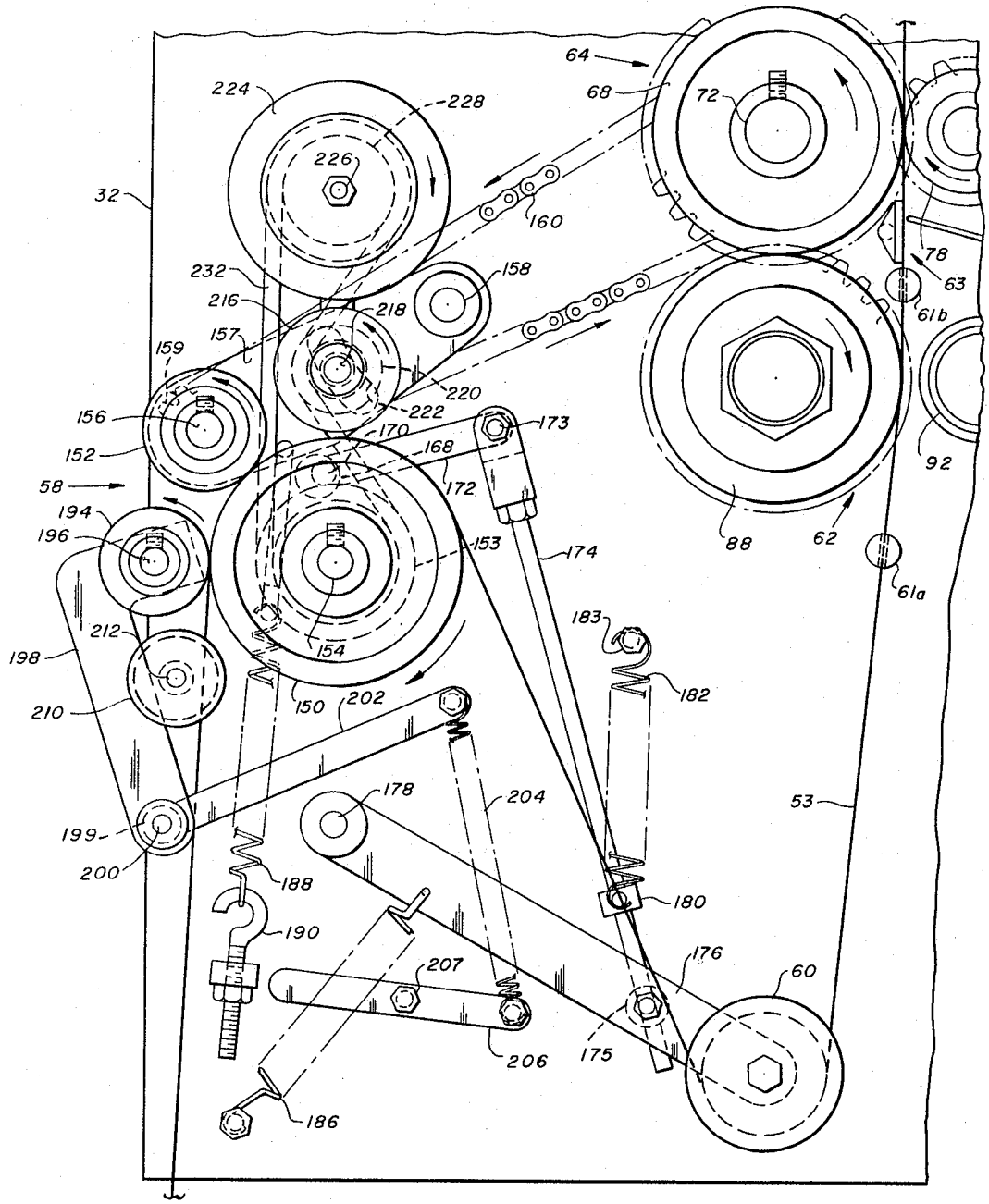
FIG. 5 is an enlarged fragmentary side view of a portion of the machine shown in FIG. 1 including a portion of the tape feed and print roll assembly and drive mechanism.

With reference to FIGS. 4 and 5, the rear set of draw rolls 58 includes a relatively large feed roll 150 and a smaller pressure roll 152. The rear feed roll is rotatably mounted on a stub shaft 154 which is fastened to the partition 32. The hub of the feed roll extends along the shaft and has fixed thereto a pulley 153. The rear pressure roll 152 has a rubber or other resilient peripheral surface and is fixed to a sleeve (not shown) which rotates on a stub shaft 156 fastened to one end of a pivot arm 157. The pivot arm is pivoted at its other end on pivot shaft 158 which is fastened to partition 32. The sleeve which carries the rear pressure roll also mounts a sprocket 159 which is driven by an endless chain 160 through another sprocket 162 (FIG. 7) on the drive shaft 72 for the top feed roll. The size of sprocket 159 and the rear pressure roll are selected so that the rear feed roll is driven at exactly the same speed as the top feed roll 68 so that when the rear pressure and feed rolls are engaged, tape is pulled from the reel by such rolls at exactly the same speed that it is fed into the loop member by the top draw rolls.

The rear pressure roll is normally maintained out of engagement with the rear feed roll and moved into engagement therewith through actuation of a cam 168 mounted on a pivot shaft 170 behind the rear feed roll 150. The cam is rotatable into and out of engagement with pivot arm 157 by a linkage which includes a cam arm 172 pivotally connected at 173 to the upper end of a cam-actuating rod 174, the lower portion of which is connected by a slidable sleeve connection 175 to a lever arm 176. The lever arm is pivoted at 178 to the partition 32 and rotatably carries at its lower end the idler wheel 60. The lower portion of the cam-actuating rod 174 includes a collar 180 to which is connected the lower end of a tension spring 182 fixed at its upper end at 183 to partition 32.

The spring tends to urge the rod 174 and thus lever arm 176 in an upward direction while a second, stronger spring 186 connected at its upper end to the lever arm and at its lower end to the partiiton 32 urges the lever arm and thus the actuating rod in a downward direction. The torque exerted on the lever arm by the lower spring 186 is greater than that exerted on the same arm by the upper spring 182 such that when the tape 53 is at rest, the lever arm is maintained in its lowermost position as shown by the dashed lines in FIG. 1 wherein the cam 168 urges the pressure roll out of engagement with the feed roll. However, when the tape is fed in a forward direction, the torque exerted by the spring 182 and tape together is sufficient to pivot the lever arm 176 upwardly into the position shown in FIG. 5, wherein the cam is rotated downwardly, out of engagement with the pivot arm 157. With the cam disengaged, a third tension spring 188 operatively connected at its upper end to pivot arm 157 and at its lower end to a threadedly adjustable hook fastener 190 secured to partition 32 urges the pivot arm downwardly whereby the pressure roll 152 engages the feed roll 150 to rotate the latter and thereby draw tape from the reel. Disengagement of the top draw rolls stops the tape 53, thereby causing the lever arm 176 to drop downwardly to again disengage pressure roll 152 through the lifting action of cam 170. Thus the operation of the rear draw rolls 58 is responsive to and coextensive with the operation of the top draw rolls.

PRINT ROLL ASSEMBLY AND DRIVE

The tape feed system includes a second pressure roll 194, preferably of rubber, which bears against the surface of the rear feed roll 150 at all times to flatten the tape against the latter roll in a predetermined lateral alignment, this being desirable when advertising matter is applied to the tape at the rear feed roll in a manner to be described. The pressure roll 194 is an idler roll which is rotatably mounted on a shaft 196 fixed to the upper end of an arm 198. The lower end of the arm is fixed to a sleeve 199 which rotates on a fixed shaft 200 fastened to partition 32. A second arm 202 is fixed to and extends forwardly from sleeve 199 at approximately right angles to arm 198. A spring 204 is connected to the opposite end of arm 202 and to one end of an adjustment bar 206 which is adjustably fastened to the partition 32 by bolt 207. Torque exerted by spring 204 on arm 202 acts through such arm and arm 198 to maintain pressure roll 194 against the feed roll 150. The pressure exerted by roll 194 against the feed roll may be varied through adjustment of the position of bar 206.

Also associated with the rear draw rolls is a lateral adjustment knob 210 which is threaded onto a stud 212 fastened to the interior partition 32. Rotation of knob 210 moves a spool-shaped alignment member having high sidewalls along the stud, the member serving as a guideway through which the tape 53 passes. The guideway is aligned with the surface of the feed roll 150 through proper adjustment of the knob, and slight adjustments of the knob are used to align the tape exactly with the type on a print roll 216, about to be described.

The print roll 216 is rotatably mounted on a fixed shaft 218 just above the rear feed roll for printing advertising matter, prices and the like in repeating fashion on one side of the tape as it is drawn over the latter roll. The print roll has a changeable rubber tire 217 containing the desired printed matter. The hub portion of the print roll extends rearwardly on its shaft and includes a pulley portion 220. The shaft itself extends through an elongate opening 222, shown in dotted lines in FIG. 5, in the pivot arm 157 and is fastened to partition 32.

Positioned vertically above the print roll is an ink roll 224, which is fixed to shaft 226 which also carries a pulley 228. Shaft 226 is rotatably mounted in bearing member 230 on partition 32. An endless belt 232 is trained about the rear feed roll, print roll and ink roll pulleys in the manner shown in FIG. 5 such that rotation of the feed roll through its pressure roll results in simultaneous rotation of the print and ink rolls. The relative sizes of the pulleys on the feed roll and print roll are selected such that the engaging surfaces of the two rolls will rotate at the same speed whereby the print roll will print legibly, without smearing on the tape as it travels over the feed roll.

TAPE FEED MAIN DRIVE

With reference to FIGS. 8 and 9, it will be apparent that operation of the entire tape feed system just described is driven through the top feed roll 68. The top feed roll in turn is driven continuously on shaft 72 through sprocket 76 on the opposite end of the shaft from the top feed roll and an endless chain 240 which extends about a second sprocket 242 of twice the diameter of sprocket 76 carried at one end of a rear transfer shaft 244. The transfer shaft extends from side to side of the machine as shown in FIGS. 1 through 3. The opposite end of the rear transfer shaft carries another, smaller sprocket 246 which is connected by an endless chain 248 to a large-diameter sprocket 250 on the drive shaft 252 of the gear head motor 34.

Thus the top feed roll is driven continuously so long as the motor 34 is energized, and the top pressure roll 78 and bottom feed roll 88 are driven continuously through their geared connections with the top feed roll. Similarly, the rear pressure roll 152 is driven continuously through its chain 160 and sprocket connection with the top feed roll. Despite the continuous rotation of the foregoing rolls, the feed rolls are not actually engaged by their respective pressure rolls to feed tape in one direction or the other except through actuation by one of the cams 114 or 115 of one of the connecting rods and the pivot plate to which it is connected as already noted with respect to FIG. 6.

To feed tape forwardly into the loop member, the cam 114 must rotate into a position wherein it pushes follower arm 112 downwardly, thereby pulling connecting rod 108 downwardly to rotate pivot plate 82 in a clockwise direction until the top pressure roll 78 bears against top feed roll 68. When this occurs, the tape is drawn upwardly and into tape chute 66, and at the same time lever arm 176 (FIG. 5) is pulled upwardly to release cam 168 so that rear pressure roll 152 engages rear feed roll 150 to pull additional tape from the reel.

To reverse the tape, the rear and top draw rolls are disengaged through release of follower arm 112 by cam 114 after which cam 116 functions in the same manner as cam 114 to rotate bottom pressure roll 92 against bottom feed roll 88. Since the bottom feed roll is driven in a direction opposite to that of the top feed roll, the direction of the tape is reversed when the bottom feed roll is engaged by its pressure roll. When the tape is reversed, it is drawn downwardly through chute 66, but the rear draw rolls 58 are disengaged at the same time so that a loop 53a of slack tape will collect momentarily below idler wheel 60, as shown in dashed lines in FIG. 1, until the top draw rolls are again engaged to take up the slack by feeding the same into the loop member 40 once again.

BRAKE ASSEMBLY

Associated with the tape feed is a brake assembly 260 which holds the tape reel against rotation when the tape feed is deactivated to prevent slack from forming. As shown in FIG. 3, the illustrated brake includes a metal shoe 261 having a face of rubber or other material having a high coefficient of friction. The shoe in its operative position bears against one outside face 262 of the tape reel. The shoe is fixed to a sleeve 264 which is rotatably mounted on a shaft 265 anchored to the frame of the machine. A lever member 266 is also fixed to the sleeve, and a vertical actuating rod 267 extends upwardly from its pivotal connection 268 adjacent one end of a pivot member 269, which in turn is pivoted at 270 to the frame of the machine. Intermediate its opposite ends the pivot member 269 carries a yoke mount 271 for the idler wheel 56. With the foregoing arrangement, pressure exerted by the tape 53 on the idler roll 56 when the tape is fed forwardly through the machine lifts pivot member 269 about its pivotal connection, resulting in release of the brake shoe from the reel to permit tape to be drawn therefrom. When the forward draw rolls disengage to stop the forward feed of tape, the weight of the brake linkage causes the pivot member to drop to its original position, whereby the brake shoe again engages the side of the reel.

TWISTER ASSEMBLY

The twister assembly, shown generally at 280, is mounted horizontally within the pair of bearing plates 282 in alignment with an opening in the front face of the machine and a central opening 284 in the base plate 48 of ring member 40. The bearing plates 282 are secured to one side of the partition 32.

With reference to FIG. 10, the twister assembly includes a tubular main housing 286 closed at its rear end by a cap 288 and closed at its forward end by the base of a housing 290 for a clamping head assembly shown generally at 300. The clamping head extends forwardly from the main housing and terminates within the central opening 284 in the ring base plate 48. Secured to the rear outer surface of the main housing is a small bevel gear 294 which is in mesh with a larger bevel gear 296 mounted on a drive shaft alongside the twister assembly.

The small bevel gear 294 has a large central recess 298 in its front face which slidably receives a cylindrical actuating sleeve 299. A sleeve bearing 302 lines the sleeve's central opening, within which an actuating rod 304 is reciprocably mounted. A rear end portion 305 of the actuating rod extends within a bearing housing 306 fastened to one of the cross frame members 26 on the back of the machine to enable the actuating rod to reciprocate without binding. The actuating rod also includes a forwardly projecting portion 307 of reduced diameter which slides within an opening 308 in the rear closure cap 288 for the main housing. The actuating rod's reduced forward end portion 307 abuts the rear end of a push rod 310 which extends longitudinally through the interior of the main housing and through an opening 311 in the base of clamp housing 290 and into the clamp head assembly.

A second push rod 312 extends through the interior of the housing and has a forward end portion which extends through a second opening 313 in the base of clamp housing 290 and into the clamp head assembly. The rear portion of push rod 312 extends through a second opening 315 in rear closure cap 288. The rear end of the push rod 312 bears against a thrust bearing assembly 317 carried within a front end opening of the actuating sleeve 299.

CLAMPING HEAD ASSEMBLY

Still referring to FIG. 10, the clamping head assembly 300 includes a first clamping means 322 for clamping the leading end of the typing tape after it has been fed up through the chute 66 and around the ring 40 and a second clamping means 324 for clamping the tape at the trailing end of the loop. With reference to the first clamp 322, each clamping means includes a fixed clamping plate 326 secured to a face plate 327, and a longitudinally reciprocable grasp 328 having an enlarged head portion 329 which is normally urged away from the fixed plate 326 by a spring 336, as shown with respect to clamp 324, to permit the tying tape to be fed therebetween.

The main portion of each movable grasp is slidably mounted within a grasp housing 330 which also carries the grasp return spring 336. Each grasp housing is pivoted to forwardly extending arms (not shown) of the clamp housing 290 by a hollow cylindrical pivot pin 332. The two grasp housings 326 are normally urged apart by a spring 334 but are movable toward one another to prevent overtensioning the tape when the ends of a loop are twisted together while held by the clamps.

Each grasp housing also includes a longitudinal rear opening 338 in alignment with one of the two openings 311, 313 in the base 290 of the clamp housing. The pivot pins 332 contain corresponding lateral openings so that the forward ends of the push rods 310 and 312 can extend one into each of the two grasp housings and into abutment with the movable grasps 328 for actuating the same.

CLAMP DRIVE

Each one of the clamps 322 and 324 is actuated through a separate linkage by a cam on the common cam shaft 115 previously referred to in connection with the tape feed drive linkage of FIG. 6. Referring to FIG. 10, the second clamp 324 is closed by push rod 310 which is pushed forwardly by grasp actuating rod 304. The actuating rod has through slot 340 intermediate its opposite ends which receives a cam portion 341 of a cam arm 342, which is fixed, as by welding, to a sleeve 344 rotatably mounted on a shaft 345 affixed to interior wall 32. Also connected to the sleeve 344 at approximately right angles to the cam arm is an actuating arm 346 which is pivoted at 347 to an internally threaded connector 348. The connector receives the upper end of a connecting rod 350, the lower end of which is connected at 351 to a follower arm 352 pivotally mounted on a follower arm shaft 354.

A cam 358 mounted on the common cam shaft 115 depresses the follower arm 352 once during each revolution of the cam shaft which through the linkage 350 and 346 and cam arm 342 pushes actuating rod 304 and thus push rod 310 forwardly to move grasp 328 of the second clamp against its fixed clamping plate 326. Return of the follower arm to its upper position results in rearward movement of the actuating rod to permit release of the clamp by release spring 336.

A second cam arm 360 has a cam portion 361 which bears against the actuating sleeve 299, as shown clearly in FIG. 12. This cam arm is fixed to a second sleeve 362 rotatable on the same shaft 345 that carries the sleeve 344 for cam arm 342. A linkage similar to that which actuates cam arm 342 also actuates the cam arm 360, such linkage including connector 363, connecting rod 364, and follower arm 366 mounted on the same follower arm shaft 354 that carries follower arm 352. Another cam 368 on common cam shaft 115 actuates follower arm 366, which in turn actuates, through its connecting linkage, cam arm 360 to push sleeve 304 forwardly, whereby push rod 312 closes the grasp 328 for the first clamp 322 against its fixed clamping plate 326. In FIG. 10 the first clamp 322 is shown in its closed position, whereas the clamp 324 is shown in its open position, with their respective actuating mechanisms shown in corresponding positions.

TWISTER DRIVE

The entire twister assembly 280, with the exception of actuating rod 304 and actuating sleeve 299, is rotated through two complete revolutions during each tying cycle of the machine and while both the first and second clamps are closed against the opposite ends of a loop of tape so as to twist the ends together and thereby secure the loop about the article being tied. Part of the drive mechanism for the twister, as already noted, includes the small bevel gear 294 on the main twister housing and the large bevel gear 296 at the inner end of a twister drive shaft 372, which is rotatably mounted in bearing member 374 on partition 32 and which extends through such partition.

The entire twister drive system is shown schematically in FIGS. 8 and 9. There it is seen that the opposite end of the twister drive shaft carries a sprocket 376 which is connected by an endless chain 378 to a second, larger sprocket 379 on one end of a front transfer shaft 380 which is in horizontal alignment with the previously mentioned rear transfer shaft 244. The front transfer shaft carries at its opposite end another, smaller sprocket 382 which is drivingly connected by endless chain 384 to a sprocket 386 of large diameter on common cam shaft 115.

The cam shaft 115 has mounted thereon a positive clutch assembly 388 including an overriding portion 388a and a fixed portion 388b which rotates with the cam shaft. The overriding portion is caused to selectively engage the fixed portion and drive the shaft by depressing a clutch release pedal 390. The sprocket 386 is fixed to the cam shaft whereas a second sprocket 392 of the same diameter as sprocket 386 forms a part of the overriding clutch portion 388a. An endless chain 394 connects sprocket 392 to a drive sprocket 396 of the same diameter on motor drive shaft 252.

The cam shaft construction just described is shown in greater detail in FIGS. 17 and 19. Clutch 388 includes a clutch release pin 398 which is normally engaged to prevent rotation of the fixed clutch portion 388b and thus the cam shaft by a clutch release arm 399 pivoted to the follower shaft 354 and biased upwardly against the clutch by a spring 397. The pedal 390 is hinged to the inner end of the release arm so that when the pedal is depressed, the arm is pivoted downwardly out of engagement with the pin to engage the clutch. The pin rotates with the engaged clutch through exactly one revolution whereupon it abuts again the release arm to disengage the clutch and positively stop rotation of the cam shaft.

Each rotation of the cam shaft defines one tying cycle of the machine, and during this cycle it will be apparent that the twister drive shaft 372 would be driven continuously by the sprocket and chain drive just described. However, this is not the case, for as shown in FIG. 13, the sprocket 376 is rotatably mounted on the twister drive shaft and forms a part of an overriding clutch portion 401 of a positive-type clutch 400 which portion is normally disengaged from a clutch portion 402 fixed to the drive shaft so that the sprocket 376 and overriding clutch portion 401 are driven continuously throughout each cycle whereas the drive shaft 372 is driven only during a short interval during each cycle.

Referring now to FIG. 14, a latch bar 404 pivoted at one end at 405 to partition 32 normally abuts at its opposite end 406 a clutch release pin 408 on fixed clutch portion 402 to disengage the clutch and thus prevent rotation of the drive shaft and twister assembly. However, the latch bar is movable downwardly to release the pin 408 and thus engage the clutch through downward movement of an attached connecting rod 410 which is pivoted at its lower end to a follower arm 412 (see FIG. 17) actuated by a cam 413 on the common cam shaft 115. When this occurs, the overriding clutch portion 401 engages fixed clutch portion 402 to turn the drive shaft and thus rotate the twister assembly through the bevel gears 296 and 294.

Downward movement of the clutch latch bar 404 simultaneously releases a gear latch bar 414 (FIG. 13) from locking engagement with the twister bevel gear 294, through lifting of ear 415 from the gear latch slot 416 in the gear, to permit the driving gear 296 to rotate the twister assembly. The gear latch 414 is pivoted at 418 to a bracket support 419 connected to partition 32, and such latch extends through an opening 420 in the partition to a pivotal connection 421 with a vertical actuating rod 422 which is pivoted at its lower end at 423 to the clutch latch 404.

A latch return spring 424 is attached at its lower end to the gear latch and at its upper end to a rod 426 fixed to wall 32 so as to return the gear latch 414 and the clutch latch 404 to their locking positions upon upward movement of follower arm 412 to its normal position. The gear latch 414 thus serves to prevent any backlash of bevel gear 294 so that rotation of the twister assembly is limited to exactly two revolutions, whereas re-engagement of clutch latch 404 with clutch pin 408 simultaneously disengages the clutch 400 to stop rotation of the drive shaft 372 despite the fact that overriding clutch portion 401 continues to be driven through the cam shaft 115. Although the illustrated gear latch operates in conjunction with the small bevel gear on the twister assembly, the latch could alternatively be made to operate with the bevel drive gear 296.

The twister control cam 413 on shaft 115 need have a dwell only long enough to drop the clutch latch and permit engagement of the twister clutch. Thereafter the clutch and its pin will rotate through only one revolution during each cycle so that gear 294 and thus the twister will rotate through two revolutions, assuming a 2:1 ratio between the two bevel gears. In other words, with the illustrated 4:1 speed ratio between the twister drive shaft and cam shaft, the drive shaft and thus the twister assembly will be operative through only 90 degrees of cam shaft rotation.

KNIFE ASSEMBLY AND DRIVE

The knife assembly which severs the loop of tape from the remaining tape is shown generally at 430 of FIG. 15 and includes a movable knife member 432 carried by a knife shaft 434 which is longitudinally reciprocable in bushings within bearing plates 282. A fixed knife 436 forms an upper end portion of the chute 66 just inside the ring base plate 48. The front cutting edge 437 of the movable knife slides across the upper edge 438 of the fixed knife to sever the tape at the upper end of the chute.

The movable knife is actuated through a knife-actuating cam arm 440 which extends within a slot 442 in the knife shaft 434. The cam arm is affixed to one end of a rotatable knife-actuating shaft 444 which extends through the interior partition 32. As shown best in FIGS. 14 and 16, a collar end portion 445 of a knife-actuating arm 446 is fixedly attached to the opposite end of shaft 444. Pivoted to the knife-actuating arm is a knife-connecting rod 48 which extends downwardly to a lower end connection with a knife follower arm 450 carried on the common follower arm shaft 354 mentioned previously with reference to FIG. 10. The follower arm is actuated by a knife cam 452 on the common cam shaft 115. Downward movement of the knife follower arm by the knife cam rotates cam arm 440 on shaft 444 through the linkage just described to push the knife shaft forwardly and the movable knife across the cutting edge surface of the fixed knife. Upward travel of the follower arm returns the movable knife to its retracted position in readiness for the next tying cycle of the machine.

It will be apparent from FIGS. 11, 15 and 16 that the cutting edge of the movable knife 432 and the cooperating upper edge of the fixed knife are inclined from the horizontal, and that the movable knife slides through an opening 454 provided in the base plate 48 of the ring member.

EJECTOR ASSEMBLY AND DRIVE

As shown in FIGS. 11 and 15, a pair of ejector members 460 and 461 extend through suitable openings in the ring base plate 48 on opposite sides of the twister assembly for the purpose of pushing a tied article clear of the base plate, thus clearing the clamps and ring of tape and enabling another length of tying tape to be fed into the ring and clamp in readiness for another tying cycle. The ejector assembly is best shown with reference to FIGS. 15 and 16, with only the ejector 460 being shown in FIG. 15 and only the ejector 461 being shown in FIG. 16. However, the two ejectors are identical. Each ejector includes a rectangular face plate portion 462 having a soft rubber or other resilient face pad 464, the face plate being seated within an opening 465 in ring base 48. An ejector rod 466 extends rearwardly from the back of the face plate and is reciprocably mounted in bushings in bearing plates 282. Each ejector rod has a slot 468 extending therethrough within which a rounded cam end 469 of a cam arm 470 extends. The cam arms for both ejector members are fixedly secured to a common ejector-operating shaft 472 which actuates both ejectors 461 and 460 simultaneously when rotated by an ejector-actuating arm 474 which is secured by a collar portion 475 thereof to the actuating shaft. The upper end of an ejector connecting rod 476 is pivoted to the ejector-actuating arm, as shown in FIG. 14, and extends downwardly to a connection at its lower end with an ejector follower arm 478 (FIG. 17) carried on follower arm shaft 354. The ejector follower arm is moved downwardly once during each machine cycle by an ejector cam 480 on the common cam shaft 115 to extend the ejector members through the linkage just described.

CAM ASSEMBLY AND TIMING

It will by now be apparent that an important feature of the present tying machine is the provision of a unique camming means, or assembly, 500 (FIGS. 1 and 2) for actuating and controlling the sequence of actuation of the various machine elements described heretofore, including the two clamps, the forward and reverse draw rolls, the knife, the twister assembly and the ejectors. With reference to FIGS. 17 and 18, this camming means includes the previously mentioned common cam shaft 115 which is rotatably supported at its opposite ends in bushings 501 in a pair of bearing plates 502 which are supported on brackets 504 fastened to upright frame members 24.

Figure 17A:
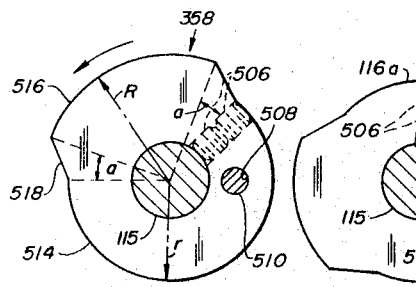

All of the cams previously mentioned for actuating the various mechanisms, including (proceeding from left to right in FIG. 17) the second grasp cam 358, the bottom, or reverse, draw roll cam 116, the forward, or top, draw roll cam 114, the first grasp cam 368, the knife cam 452, the twister cam 413 and the ejector cam 480 are affixed to the cam shaft 115 by set screws 506, as shown in FIG. 17A. Collars 505 adjacent the opposite ends of the shaft prevent lateral shifting movement thereof. The foregoing cams are shown in detail in FIGS. 17A through 17I and each is provided with a small circular opening 508 through which an alignment rod 510 extends parallel to the cam shaft for maintaining the various cams in a predetermined exact relationship to one another so that the correct timing sequence of the various cams will be maintained at all times. The alignment rod is secured against longitudinal movement by a pair of alignment plates 512 which are secured to the cam shaft in the same manner as the cams.

Referring, for example, to the second grasp cam 358 of FIG. 17A, each of the cams includes a relieved surface portion 514 which conforms to an arc of a circle having a radius $r$ and a camming surface portion 516 which also conforms to an arc of a circle, but with a larger radius $R$. The camming surface portion is connected to the relieved surface portion by inclined transfer portions 518, each of which encompasses a segment $a$ of approximately 20 degrees of a circle so as to provide a gradual lowering and raising of the follower arms to minimize wear and noise. The cams may be made of metal, but are preferably made of a long-wearing synthetic material such as nylon to reduce noise. The radii $R$ of the camming surfaces of all the actuating cams are approximately uniform, and similarly the radii $r$ of the recessed surfaces of all the cams are substantially constant, thus simplifying the design, assembly and adjustment of the cams.

Figure 17B:
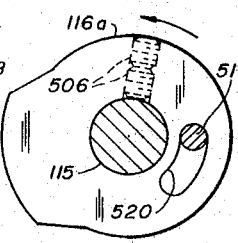
Figure 17C:
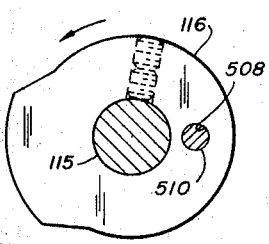
Figure 17D:
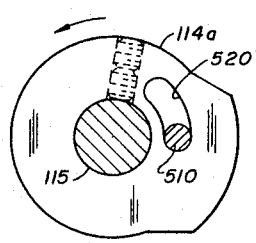
Figure 17E:
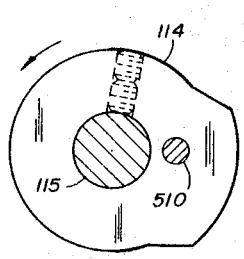

In addition to the actuating cams, there are also provided on the shaft 115 two adjustment cams, including an adjustable bottom draw roll cam 116a shown in FIG. 17B and an adjustable top draw roll cam 114a shown in FIG. 17D, which cams are mounted in side-by-side abutment with their respective bottom and top draw roll cams 116 and 114 to provide the latter cams with an adjustable dwell, thus providing a means for controlling and varying the size of the tape loop formed. Each adjustable cam has exactly the same outline shape as its principal cam, as will be evident from comparing FIGS. 17B and C and FIGS. 17D and E. The only difference between the adjustable cams and their primary cams is that the adjustable cams have an elongate circumferential slot 520 instead of the circular opening 510 of the primary cams so that the adjustable cams can be rotated on the cam shaft within the limits of the slot relative to their primary cams. The cam 116a is rotated in a counterclockwise direction as shown in FIG. 17B to increase the effective dwell of cam 116, whereas the cam 114a is rotated in a clockwise direction in FIG. 17D to effectively lengthen the camming surface of cam 114. Both adjustable cams are shown in their unadjusted positions wherein their primary cams have a minimum dwell.

FIG. 18 shows a typical cam, follower arm and connecting rod assembly, with reference to the ejector cam 480. The follower arm 478 is pivoted at one end 522 to the common follower arm shaft 354 which is fixed at its opposite ends in the same bearing plates 502 which rotatably carry the cam shaft. Each follower arm includes an upwardly projecting follower lift 524 which is maintained in constant engagement with the peripheral surface of its coacting cam by a push rod 526, the upper end of which is urged against the bottom edge of the follower arm by a follower spring 528 seated between threadedly adjustable nut members 530 on the rod and the top surface of a push rod holder 532. The push rod holder is rigidly anchored to the base of the machine, and the lower ends of the push rods for all of the follower arms extend through openings in the top of the holder, as shown in FIG. 17.

The follower arm assembly just described with respect to the ejector cam 480 also describes the follower arm assembly for each of the other cam members. It should be noted from FIG. 17 that with but two exceptions each of the follower arms is aligned directly beneath its cooperating cam. However, the follower arms 113 and 112 for the bottom and top draw rolls, respectively, are positioned in each case beneath and between the primary cam and its adjacent adjustable cam so that the camming surfaces of both the adjustable cam and the primary cam operate the follower arm.

Again referring to FIG. 18, and specifically to the connecting rod 476, each connecting rod is made in two parts including a short, lower section 534 pivoted to the forward end of its corresponding follower arm at an opening 536 through the latter, and a longer, upper section 535 (see FIG. 10), the two sections being connected together by a turnbuckle 538 for providing the rods with an adjustable length.

OVERALL OPERATION

The overall operation of the machine can best be described with reference to the bar diagram of FIG. 20 and to the relative positions of the cams as shown in FIGS. 17A through 17I. The cams of FIGS. 17A through I are shown in their actual positions relative to one another on the cam shaft at the start of a machine cycle, and each cam is listed in the vertical column at the left-hand side of the chart of FIG. 20 in exactly the same descending order as shown progressively in FIGS. 17A through I. Proceeding horizontally across the top of the chart the number of degrees, 360°, is indicated through which the cam shaft, and thus each cam, rotates during one complete cycle of the machine. The cam shaft rotates continuously at a constant speed through each machine cycle, and in a counterclockwise direction as viewed in FIGS. 17A through I.

Figure 17F:
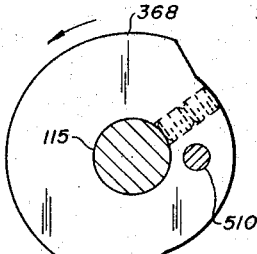
Figure 17G:
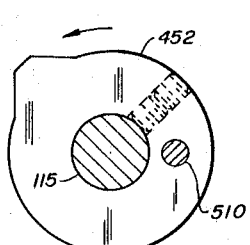
Figure 17H:
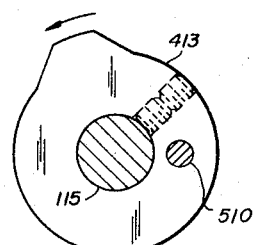
Figure 17I:
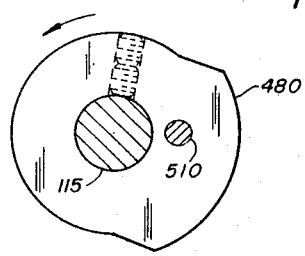

From FIGS. 20 and 17F it will be seen that only the first clamp is closed at the start of a machine cycle, this being the very last operation performed, beginning at the 360-degree position of the cam shaft, by the machine during the preceding cycle (note No. 1 grasp cam 368 in FIG. 20). Also from the bar diagram it will be obvious that the next-to-last operation performed by the machine during its preceding cycle, beginning at the 250-degree position of the cam shaft, is the actuation of the forward draw rolls by the top draw roll actuating cam 114. Thus at the start of each tying cycle, a loop of tape lies within the groove of the loop-forming ring 40, and its leading edge is clamped within the first clamp 322 on the twister head 280.

Assuming that the gear head motor 34 has been energized through actuation of the switch S, and a bundle to be tied is held within the ring 40 by the machine operator, the foot pedal 390 is tripped to engage the cam shaft clutch 388, whereby the cam shaft begins its rotation through one complete revolution.

Thereafter, the first thing that happens is at 25 degrees of cam shaft rotation where the bottom draw roll cam 116 begins to actuate the reversing pressure roll 92. At 45 degrees the pressure roll is bearing fully against the bottom feed roll whereby the tape 53 is drawn tightly about the bundle until stopped by the torque limiter. At 90 degrees, while the tape is still being reversed, the second grasp begins to close against the lower end of the tape loop. At 110 degrees closure of the second clamp 324 is complete, and at the same time, the bottom pressure roll is released from engagement with the bottom feed roll. At this point a loop of tape is tightened about the bundle and the two clamps 322 and 324 clamp the loop ends to the twister head.

At 110 degrees, the same time that the second clamp closes and the bottom draw rolls disengage, the knife cam 452 begins to slide the knife against the tape, and at 130 degrees the tape is severed, immediately after which, at 140 degrees, the knife is returned to its retracted position. It will be understood that the dog clamp 63 maintains a constant light pressure on the tape to prevent unthreading thereof after the severing operation. Even while the knife is severing the tape, at 130 degrees, the twister cam 413 begins to release the gear and twister clutch latches 414 and 404, and at 150 degrees the latches are fully disengaged whereby the twister rotates to twist the ends of the tape loop together. Such rotation continues through 90 degrees of cam shaft rotation, as indicated by the dashed lines in FIG. 20, even though the cam itself is operable only through 20 degrees as previously explained.

The next thing that happens, at 200 degrees of the 360-degree cycle, is the release of the ends of the tape loop through the opening of the first and second clamps by their respective cams 368 and 358. After the clamps are released, at 200 degrees, the ejector cam 480 begins to extend the two ejectors 460 and 461, and at 240 degrees, at the same time the twister stops rotating, the ejectors are fully extended to push the tied bundle from the base of the ring, thus clearing the clamps of tape. While the ejectors are still extended, at the 250-degree position of the cam shaft, the top draw roll cam 114 becomes operative to pivot the top pressure roll 78 into engagement with the top feed roll 68, resulting also in activation of the rear draw rolls 58 to feed another length of tape 53 into the loop-forming ring 40 in readiness for the next machine cycle.

In the diagram of FIG. 20 it is seen that the feeding of tape into the loop-forming member continues during a 70-degree rotation of the cam shaft, to the 320-degree point, at which point the top draw rolls, and thus the entire forward feed system becomes inoperative. At 340 degress, the ejector cam 480 returns to its inoperative position to retract the ejectors, and at the same time the first grasp cam 368 begins to close the first clamp 322 against the leading end of the newly formed loop so that at the end of the full 360-degree cycle, the first clamp will be closed against such end. As noted earlier, after one complete revolution of the cam shaft, the cam shaft clutch is automatically disengaged and the main cam shaft portion abruptly stopped by the clutch release arm 399. Another cycle is commenced by again depressing the clutch release pedal 390.

It will be apparent from the foregoing description of the operation of the machine that the length of dwell for the various cams and the point within each cycle at which each cam becomes operative is illustrative only and could be varied. Similarly the details of the various mechanisms are illustrative only. For example, the cam shaft clutch release pedal which is deperessed to start each machine cycle could be replaced with an electrical system including a starter button and a solenoid-actuated clutch release.

No doubt numerous other modifications in operation, arrangement and detail will occur to those skilled in the art upon inspection of the foregoing description. It is my intention to claim as my invention all such modifications in operation, arrangement and detail as come within the true spirit and scope of the following claims.

I claim:
1. A tying machine comprising:
reel means for storing a supply of typing tape,
loop-forming means for forming a length of said tape into a loop about an article to be tied,
and tape-feeding means, including first draw roll means adjacent said loop-forming means for feeding a predetermined length of said tape in a forward direction into said loop-forming means whereby a loop of tape is formed about said article,
second draw rolls means operable after said first draw roll means for feeding said tape in a reverse direction and thereby withdrawing a length of tape from said loop-forming means,
and third draw roll means remote from said loop-forming means and operable concurrently with and at the same speed as said first draw roll means for drawing tape from said reel means as said first draw roll means feeds tape into said loop-forming means.

2. A tying machine comprising:
reel means for storing a roll of typing tape,
loop-forming means for forming a length of tape into a wide loop about an article to be tied,
and tape-feeding means, including first draw roll means adjacent said loop-forming means for feeding a predetermined length of said tape in one direction into said loop-forming means whereby a loop of tape is formed about said article,
clamping means for clamping the free end of said loop of tape,
second draw roll means operable after deactivation of said first draw roll means and after said clamping means has clamped the free end of said loop for reversing the direction of said tape and thereby tightening said loop about said article to be tied,
said second draw roll means including adjustable torque limiting means for drawing said loop about said article to a preset but variable tightness,
and third draw roll means toward said reel from said first and second draw roll means including means for operating said third draw roll means in response to operation of said first draw roll means and concurrently with, at the same speed as, and in the same direction as said first draw roll means.

3. A tying machine according to claim 1 including third draw rolls actuating means responsive to the forward movement of said tape by said first draw roll means for actuating said third draw roll means.

4. A tying machine according to claim 3 wherein said third draw roll actuating means includes and idler wheel means for engaging said tape between said first draw roll means and said third draw roll means, lever means movable in response to forward movement of said tape mounting said idler wheel means, and means interconnecting said lever means and said third draw roll means for actuating the latter in response to movement of said lever means.

5. In a tying machine comprising in combination loop-forming means, means for feeding a length of tape into said loop-forming means, means for tightening a loop of tape formed by said loop-forming means about a bundle to be tied, means for severing said loop from a tape supply, and a rotatably mounted twister means for twisting the ends of said loop together to secure said bundle,
a drive means for rotating said twister means comprising:
a twister drive shaft,
gear means interconnecting said drive shaft and said twister means,
a prime mover,
means drivingly connecting said prime mover and said drive shaft including clutch means on said drive shaft for drivingly engaging said shaft,
stop means movable into and out of abutment with said clutch means to engage and release the last-mentioned means and thereby drive and release said shaft,
and means driven by said prime mover for releasing said stop means from engagement with said clutch means for an interval to effect rotation of said twister means.

6. In a tying machine comprising in combination loop-forming means, means for feeding a length of tape into said loop-forming means, means for tightening a loop of tape formed by said loop-forming means about a bundle to be tied, means for severing said loop from a tape supply, and a rotatably mounted twister means for twisting the ends of said loop together to secure said bundle,
a drive means for rotating said twister means comprising:
a twister drive shaft,
gear means interconnecting said drive shaft and said twister means,
a prime mover,
means drivingly connecting said prime mover and said drive shaft including normally disengaged clutch means on said drive shaft for driving said shaft when engaged,
stop means movable into and out of abutment with said clutch means to engage and release the last-mentioned means and thereby drive and release said shaft, and rotatable cam means driven by said prime mover and operatively connected to said stop means, said cam means normally maintaining said stop means in locking engagement with said clutch means but moving said stop means out of engagement therewith for an interval of less than one revolution of said drive shaft during each revolution of said cam means to effect rotation of said twister means during the same said interval.

7. In a tying machine comprising in combination loop-forming means, means for feeding a length of tape into said loop-forming means, means for tightening a loop of tape formed by said loop-forming means about a bundle to be tied, means for severing said loop from the remainder of said tape, and rotatably mounted twister means for twisting the ends of said loop together to secure said bundle, a drive means for rotating said twister means comprising:

a twister drive shaft, gear means interconnecting said drive shaft and said twister means, a prime mover, means operably connecting said prime mover and said drive shaft including normally disengaged clutch means on said drive shaft for driving said shaft when engaged, first stop means movable into and out of abutment with said clutch means to engage and release the last-mentioned means and thereby drive and stop said drive shaft, second stop means movable into and out of engagement with said gear means for locking and releasing the same, said second stop means being operably interconnected with said first stop means such that release and engagement of one effects simultaneous release and engagement of the other, and actuating means driven by said prime mover for actuating said first and second stop means, said actuating means normally maintaining said first and second stop means in locking abutment with said clutch and gear means but moving the latter out of locking abutment with their respective means for a short interval corresponding to less than one revolution of said drive shaft such that said clutch and gear means are re-engaged by said first and second stop means upon one revolution of said drive shaft and such that said twister means is rotated through a predetermined number of revolutions during the rotation of said drive shaft.

8. A tying machine comprising:

a loop-forming means, means for feeding a length of tape into said loop-forming means to form said length into a loop, means for reversing said tape to tighten the loop about an article, means for clamping the opposite ends of said loop, means for severing said loop from a tape supply, rotatably mounted twister means for twisting the clamped ends of said loop together, and twister drive means for rotating said twister means, said drive means including a twister drive shaft drivingly engaging said twister means, cam means including a rotatable cam shaft and a twister cam member on said cam shaft, a prime mover, normally disengaged cam shaft clutch means for drivingly connecting said prime mover to said cam shaft, normally disengaged drive shaft clutch means for drivingly connecting said prime mover to said drive shaft, means drivingly interconnecting said drive shaft clutch means and said prime mover, drive shaft clutch engaging means for engaging said drive shaft clutch means to said drive shaft, means operatively connecting said cam member to said drive shaft clutch engaging means such that rotation of said cam shaft effects engagement of said drive shaft clutch to rotate said twister means, and cam shaft clutch engaging means for selectively engaging said cam shaft clutch through a predetermined number of revolutions of said cam shaft and then automatically disengaging the same, such that said twister means is rotated for a predetermined interval during the rotation of said cam shaft.

9. A tying machine according to claim 8 wherein:

said means drivingly interconnecting said drive shaft clutch means and said prime mover includes said cam shaft, and speed-increasing means drivingly interconnecting said cam shaft and said drive shaft clutch means such that said twister drive shaft is driven at a greater speed than said cam shaft.

10. A tying machine according to claim 8 wherein:

said means drivingly interconnecting said drive shaft clutch means and said prime mover includes said cam shaft, a transfer shaft, and speed-increasing means drivingly interconnecting said cam shaft, transfer shaft and said drive shaft clutch means such that said drive shaft is driven at a speed of at least about four times the speed of said cam shaft.

11. A tying machine according to claim 8 including gear means interconnecting said twister means and said drive shaft for rotating said twister means at a speed of at least about twice that of said drive shaft, and wherein said means drivingly interconnecting said drive shaft clutch means and said prime mover includes said cam shaft, a transfer shaft and speed-increasing means drivingly interconnecting said cam shaft, transfer shaft and said drive shaft clutch means such that said drive shaft is driven at a speed of at least about four times the speed of said cam shaft, whereby said twister means is rotated at a speed of at least about eight times that of said cam shaft.

12. A tying machine comprising in combination:

a loop-forming means for forming a length of tying tape into a loop about an article to be tied, tape-feeding means for feeding said length of tape into said loop-forming means, tape-feeding cam means for actuating said tape-feeding means, twister means rotatably mounted adjacent said loop-forming means for twisting together the ends of a loop of tape, twister cam means for actuating said twister means, first clamping means on said twister means for clamping the leading end of a loop of tape within said loop-forming means, first clamp cam means for actuating said first clamping means, second clamping means on said twister means for clamping the opposite end of said loop, second clamp cam means for actuating said second clamping means, tape-reversing means for tightening said loop about said article, tape-reversing cam means for activating said tape-reversing means, knife means for severing the opposite end of said loop from the supply of tape in said machine, knife cam means for actuating said knife means, ejector means for aiding the removal of said article from said loop-forming means and said loop from said first and second clamping means, ejector cam means for actuating said ejector means, and common cam shaft means mounting each of the aforementioned cam means.

13. A tying machine comprising in combination:
a loop-forming means for forming a length of tying tape into a loop about an article to be tied,
tape-feeding means for feeding said length of tape into said loop-forming means,
tape-feeding cam means for actuating said tape-feeding means,
twister means rotatably mounted adjacent said loop-forming means for twisting together the ends of a loop of tape,
twister cam means for actuating said twister means,
first clamping means on said twister means for clamping the leading end of a loop of tape within said loop-forming means,
first clamp cam means for actuating said first clamping means,
second clamping means on said twister means for clamping the opposite end of said loop,
second clamp cam means for actuating said second clamping means,
tape-reversing means for tightening said loop about said article,
tape-reversing cam means for activating said tape-reversing means,
knife means for severing the opposite end of said loop from the supply of tape in said machine,
knife cam means for actuating said knife means,
ejector means for aiding the removal of said article from said loop-forming means and said loop from said first and second clamping means,
ejector cam means for actuating said ejector means,
and common cam shaft means mounting each of the aforementioned cam means,
each of said cam means operating its associated said means once during each revolution of said cam shaft,
said cam means being arranged on said cam shaft relative to one another such that the following sequence of operations occurs upon rotation of said cam shaft, although not necessarily beginning with the first-stated operation:
 (1) said tape is fed into said loop-forming means to form a loop,
 (2) said first clamping means is closed,
 (3) said tape is reversed,
 (4) said second clamping means is closed,
 (5) said loop is severed from the remainder of said tape,
 (6) said twister is rotated,
 (7) said first and second clamping means are released, and
 (8) said ejector means is activated.

14. A tying machine comprising in combination:
a loop-forming means for forming a length of tying tape into a loop about an article to be tied,
tape-feeding means for feeding said length of tape into said loop-forming means,
tape-feeding cam means for actuating said tape-feeding means,
twister means rotatably mounted adjacent said loop-forming means for twisting together the ends of a loop of tape,
twister cam means for actuating said twister means,
first clamping means on said twister means for clamping the leading end of a loop of tape within said loop-forming means,
first clamp cam means for actuating said first clamping means,
second clamping means on said twister means for clamping the opposite end of said loop,
second clamp cam means for actuating said second clamping means,
tape-reversing means for tightening said loop about said article,
tape-reversing cam means for activating said tape-reversing means,
knife means for severing the opposite end of said loop from the supply of tape in said machine,
knife cam means for actuating said knife means,
ejector means for aiding the removal of said article from said loop-forming means and said loop from said first and second clamping means,
ejector cam means for actuating said ejector means,
and common cam shaft means mounting each of the aforementioned cam means,
said tape-feeding cam means and said tape-reversing cam means each including adjustment means for varying the dwell thereof and thereby varying the size of the loop formed and tightened about an article to be tied.

15. A tying machine comprising in combination:
a loop-forming means for forming a length of tying tape into a loop about an article to be tied,
tape-feeding means for feeding said length of tape into said loop-forming means,
tape-feeding cam means for actuating said tape-feeding means,
twister means rotatably mounted adjacent said loop-forming means for twisting together the ends of a loop of tape,
twister cam means for actuating said twister means,
first clamping means on said twister means for clamping the leading end of a loop of tape within said loop-forming means,
first clamp cam means for actuating said first clamping means,
second clamping means on said twister means for clamping the opposite end of said loop,
second clamp cam means for actuating said second clamping means,
tape-reversing means for tightening said loop about said article,
tape-reversing cam means for activating said tape-reversing means,
knife means for severing the opposite end of said loop from the supply of tape in said machine,
knife cam means for actuating said knife means,
ejector means for aiding the removal of said article from said loop-forming means and said loop from said first and second clamping means,
ejector cam means for actuating said ejector means,
and common cam shaft means mounting each of the aforementioned cam means,
said tape-feeding cam means and said tape-reversing cam means each including a pair of cam members including a first cam member fixedly secured to said cam shaft and a second cam member adjacent said first cam member adjustably secured to said cam shaft for rotation on said shaft relative to said first cam member and thereby varying the effective dwell of said first cam member.

16. In a tying machine having a loop-forming means for forming a length of tape into a loop about an article to be tied, tape-feeding means for feeding said length of tape into said loop-forming means, tape-reversing means for tightening said loop about said article, tape-clamping means for clamping both ends of said loop, knife means for severing said loop from a supply of said tape, and twister means for twisting the ends of said loop together while clamped to secure the tightened loop about said article,
cam-actuating means for actuating said aforementioned feeding means, reversing means, clamping means, knife means and twister means in predetermined sequence including:
a cam shaft,
a plurality of cam members mounted on said cam shaft, one for operating each of said aforementioned means once during each revolution of said cam shaft,
linkage means operatively connecting each of said cam members with the associated aforementioned means which it actuates, and drive means for rotating said cam shaft,
said drive means including normally disengaged positive clutch means for selectively engaging said cam shaft,
a prime mover drivingly connected to said clutch means,
means for selectively engaging said clutch means to drive said cam shaft,
and means in association with said engaging means and said clutch means for automatically disengaging said clutch means from said cam shaft upon one revolution of said cam shaft.

17. A tying machine comprising:
an upstanding frame,
a loop-forming means mounted on the front of said frame including a loop-shaped member having an internal helical track around which a length of tape is fed,
said loop-shaped member including an infeed end and an adjacent but laterally and longitudinally spaced outfeed end, both terminating at the front of said frame,
a twister means including a hollow main housing portion rotatably mounted on said frame,
a clamping head portion at one end of said main housing terminating adjacent the opposite ends of said loop-shaped member,
and a clamp-actuating portion at the opposite end of said main housing portion mounted for longitudinal movement toward and away from said main housing,
first clamping means on said clamping head in alignment with the outfeed end of said track,
second clamping means on said clamping head in alignment with the infeed end of said track,
push rod means extending longitudinally through said main housing and operably connecting said first and second clamping means with said clamp-actuating portion,
and clamp drive means for moving said clamp-actuating portion toward and away from said main housing and thereby actuating said first and second clamping means.

18. A tying machine according to claim 17 including means pivotally mounting said first and second clamping means for movement toward and away from one another and resilient means normally urging said first and second clamping means apart but permitting relative movement thereof toward one another upon rotation of said twister means with the ends of a loop of tape clamped one within each of said clamping means.

19. A tying machine according to claim 17 wherein:
said clamp-actuating portion includes a longitudinally movable clamp-actuating sleeve and a clamp-actuating rod slidable longitudinally within and relative to said sleeve,
said push rod means includes a pair of push rods including one in abutment with said sleeve and one of said clamping means and the other in abutment with said actuating rod and the other of said clamping means,
said clamp drive means includes a first means for actuating said sleeve and a second means for actuating said actuating rod.

20. In a tying machine comprising in combination loop-forming means, means for feeding a length of tape into said loop-forming means to form a loop, means for tightening said loop about a bundle to be tied, means for severing said loop from the remainder of said tape, a rotatably mounted twister means for twisting the ends of said loop together to secure said bundle, and drive means for driving said aforementioned tape-feeding means, tape-tightening means, taper-severing means and twister means including means for actuating said aforementioned means in timed relation to one another,
said twister means comprising:
a hollow, cylindrical main housing portion,
means mounting said main housing portion for rotation about its longitudinal axis,
a clamping head extending from one end of said main housing portion and terminatnig adjacent said loop-forming means,
and a clamp-actuating portion extending from the opposite end of said main housing portion,
a pair of clamping means on said clamping head including a first clamping means for clamping the leading end of said loop, and a second clamping means for clamping the opposite end of said loop,
means mounting said first and second clamping means for lateral separating movement,
push rod means within said main housing portion including a first push rod for actuating said first clamp means and a second push rod for actuating said second clamp means,
said clamp-actuating portion including a sleeve portion movable toward and away from said main housing for actuating one of said push rods and an actuator member slidable within said sleeve for actuating the other of said push rods.

21. In a tying machine comprising in combination loop-forming means, means for feeding a length of tape into said loop-forming means to form a loop, means for tightening said loop about a bundle to be tied, means for severing said loop from the remainder of said tape, a rotatably mounted twister means for twisting the ends of said loop together to secure said bundle, and drive means for driving said aforementioned tape-feeding means, tape-tightening means, tape-severing means, and twister means in timed relation to one another,
said twister means comprising a hollow, cylindrical main housing,
a clamping head extending from one end of said main housing and terminatnig adjacent said loop-forming means,
and a clamp-actuating portion extending from the opposite end of said main housing,
means mounting said main housing portion for rotation about its longitudinal axis,
a pair of clamping means within said clamping head including a first clamping means for clamping the leading end of said loop, and a second clamping means for clamping the opposite end of said loop,
means mounting said first and second clamping means for lateral separating movement,
push rod means within said main housing including a first push rod for actuating said first clamp means and a second push rod for actuating said second clamp means,
said clamp-actuating portion including a sleeve portion movable toward and away from said main housing for actuating one of said push rods and an actuator member slidable within said sleeve for actuating the other of said push rods,
and gear means fixedly mounted on said main housing portion and being drivingly connected to said driving means for rotating said main housing and said first and second clamping means.

22. A tying machine comprising:
an upright machine frame,
a loop-forming ring on the front of said frame,
a tape reel on the back of said frame,
a first pair of forward draw rolls for drawing tape from said reel including a feed roll and a pressure roll movable into and out of engagement with said feed roll,
means responsive to the forward movement of said tape for actuating said pressure roll into and out of engagement with said feed roll,
normally engaged brake means for said reel, including means for releasing said brake means in response to forward movement of said tape,
a pair of reverse draw rolls positioned in a direction toward said loop-forming ring from said first pair of forward draw rolls, including a reverse feed roll and a reverse pressure roll movable into and out of engagement with said reverse feed roll for feeding tape in a direction away from said loop-forming ring,
reverse draw roll drive means including reverse pressure roll actuating means,
said reverse pressure roll actuating means including reverse cam means,
a second pair of forward draw rolls between said reverse draw rolls and said loop-forming ring including a second forward feed roll and a second forward pressure roll movable into and out of engagement with said second forward feed roll,
forward draw roll drive means including second forward pressure roll actuating means,
said second forward pressure roll actuating means including a forward cam means,
print roll means in association with said first pair of forward draw rolls and operable in response to operation of said first forward draw rolls for applying printed matter to said tape,
rotatable twister means rearwardly adjacent said loop-forming ring including a clamping head portion terminating within an opening defined by said ring,
twister drive means for rotating said twister means including twister-actuating means for controlling the rotation thereof,
said twister-actuating means including twister cam means,
chute means between said loop-forming ring and said second pair of forward draw rolls for directing said tape into said ring,
clamping means on said clamping head portion including first clamping means for clamping the leading end of a loop of tape formed within said loop-forming ring, and a second clamping means for clamping the opposite end of said loop,
said first and second clamping means both being pivotally mounted on said clamping head portion for lateral movement toward and away from one another,
first and second clamp-actuating means for actuating said first and second clamping means independently of one another,
said first and second clamp-actuating means including first and second clamp cam means,
knife means between said second clamping means and second pair of forward draw rolls for severing the loop of tape from the tape supply,
knife-actuating means including a knife cam means,
third tape-clamping means beneath said knife means for clamping the leading portion of the tape remaining between the draw rolls after the severing of said loop,
ejector means for ejecting the loop ends from said first and second clamping means to aid removal of the loop from said ring,
ejector-actuating means including ejector cam means,
a common cam shaft mounting all of said aforementioned cam means,
a prime mover common to and activating each of said forward draw roll drive means, reverse draw roll means and twister drive means,
cam shaft clutch means drivingly connecting said prime mover to said cam shaft,
said twister drive means including twister clutch means drivingly connecting said prime mover to said twister means,
said twister clutch means being engaged and disengaged through operation of said twister cam means,
said forward and reverse cam means each including an adjustable cam means for varying the dwell thereof,
each of said cam means being shaped to actuate its associated means once during each revolution of said cam shaft whereby one tying cycle of the machine is completed during each revolution of said cam shaft,
all of said cam means being arranged on said cam shaft relative to one another for operating their associated means in predetermined timed relation to one another,
and control means for selectively engaging said cam shaft clutch means and for automatically disengaging said clutch means after one complete revolution of said cam shaft.

23. In a tying machine having a loop-forming means for forming a length of tape into a loop about an article to be tied, tape-feeding means for feeding said length of tape into said loop-forming means, tape-reversing means for tightening said loop about said article, tape-clamping means for clamping both ends of said loop, knife means for severing said loop from a supply of said tape, and twister means for twisting the ends of said loop together while clamped to secure the tightened loop about said article,
 cam-actuating means for acutating said aforementioned feed means, reversing means, clamping means, knife means and twister means in predetermined sequence including:
 a cam shaft,
 a plurality of cam members mounted on said cam shaft, one for operating each of said aforementioned means means once during each revolution of said cam shaft,
 linkage means operatively connecting each of said cam members with the associated aforementioned means which it actuates,
 said linkage means for each of said cam members including follower cam means pivoted to a follower arm shaft common to the follower arm means for all said cam members, and connecting rod means connecting said follower arms means to the associated means to be activated,
 and drive means for rotating said cam shaft including means for limting the rotation of said cam shaft to one complete revolution for each tying cycle of the machine.

24. In a tying machine having a loop-forming means for forming a length of tape into a loop about an article to be tied, tape-feeding means for feeding said length of tape into said loop-forming means, tape-reversing means for tightening said loop about said article, tape-clamping means for clamping both ends of said loop, knife means for severing said loop from a supply of said tape, and twister means for twisting the ends of said loop together while clamped to secure the tightened loop about said article,
 cam-actuating means for actuating said aforementioned feeding means, reversing means, clamping means, knife means and twister means in predetermined sequence including:
 a cam shaft,
 a plurality of cam members mounted on said cam shaft, one for operating each of said aforementioned means once during each revolution of said cam shaft,
 linkage means operatively connecting each of said cam members with the associated aforementioned means which it actuates,
 said linkage means including follower arm means pivoted to a common follower arm shaft, lever means connected to the means to be activated, and connecting rod means connecting said follower arm means to said lever means,
 and drive means for rotating said cam shaft including means for limiting the rotation of said cam shaft to one complete revolution for each tying cycle of the machine.

25. In a tying machine having a loop-forming means for forming a length of tape into a loop about an article to be tied, tape-feeding means for feeding said length of tape into said loop-forming means, tape-reversing means for tightening said loop about said article, tape-clamping means for clamping both ends of said loop, knife means for severing said loop from a supply of said tape, and twister means for twisting the ends of said loop together while clamped to secure the tightened loop about said article, cam-actuating means for actuating said aforementioned feeding means, reversing means, clamping means, knife means and twister means in predetermined sequence including:
a cam shaft,
a plurality of cam members mounted on said cam shaft, one for operating each of said aforementioned means once during each revolution of said cam shaft, each of said cam members including an arcuate recessed peripheral surface portion having a center of curvature coincident with the axis of said shaft and an arcuate camming surface portion having a center of curvature coincident with said axis,
linkage means operatively connecting each of said cam members with the associated aforementioned means which it actuates,
and drive means for rotating said cam shaft including means for limiting the rotation of said cam shaft to one complete revolution for each tying cycle of the machine.

26. A tying machine according to claim 25 wherein the radii of curvature of said arcuate recessed surfaces on all said cam members are constant and the radii of curvature on said arcuate camming surfaces on all said cam members are also constant.

References Cited by the Examiner
UNITED STATES PATENTS

| | | | |
|---|---|---|---|
| 2,080,149 | 5/1937 | Parker | 100—32 X |
| 2,134,186 | 10/1938 | Harvey | 100—31 X |
| 2,195,043 | 3/1940 | Wright | 100—26 |
| 2,215,121 | 9/1940 | Harvey et al. | 100—26 X |
| 2,416,859 | 3/1947 | Vining et al | 100—26 |
| 3,088,397 | 5/1963 | Martin et al. | 100—26 |
| 3,157,109 | 11/1964 | Flanigan et al. | 100—26 |
| 3,179,037 | 4/1965 | Cranston et al. | 100—26 X |
| 3,179,038 | 4/1965 | MacKenzie | 100—26 |
| 3,183,824 | 5/1965 | Cook | 100—26 X |
| 3,196,779 | 7/1965 | Embree | 100—26 X |

BILLY J. WILHITE, *Primary Examiner.*

UNITED STATES PATENT OFFICE
CERTIFICATE OF CORRECTION

Patent No. 3,318,230

May 9, 1967

Frank E. Hilton

It is hereby certified that error appears in the above numbered patent requiring correction and that the said Letters Patent should read as corrected below.

Column 3, line 69, for "behinde" read -- behind --; column 6, line 6, for "size" read -- sizes --; column 9, line 14, for "typing" read -- tying --; column 11, line 73, for "48" read -- 448 --; column 15, line 5, for "200" read -- 220 --; line 22, for "degress" read -- degrees --; line 39, for "deperessed" read -- depressed --; column 16, line 20, for "rolls" read -- roll --; line 24, for "and" read -- an --; column 21, line 69, for "taper" read -- tape --; column 22, line 34, for "terminatnig" read -- terminating --; column 24, line 26, for "means means" read -- means --; line 35, for "arms" read -- arm --.

Signed and sealed this 14th day of November 1967.

(SEAL)
Attest:

EDWARD M. FLETCHER, JR.
Attesting Officer

EDWARD J. BRENNER
Commissioner of Patents